United States Patent
Khajehoddin et al.

(10) Patent No.: US 8,688,287 B2
(45) Date of Patent: Apr. 1, 2014

(54) DISTRIBUTED POWER GENERATION INTERFACE

(75) Inventors: Sayed Ali Khajehoddin, Kingston (CA); Masoud Karimi Ghartemani, Kingston (CA); Praveen Jain, Kingston (CA); Alireza Bakhshai, Kingston (CA)

(73) Assignee: Sparq Systems Inc., Kingston, ON (CA)

( * ) Notice: Subject to any disclaimer, the term of this patent is extended or adjusted under 35 U.S.C. 154(b) by 467 days.

(21) Appl. No.: 12/884,822

(22) Filed: Sep. 17, 2010

(65) Prior Publication Data
US 2011/0130889 A1      Jun. 2, 2011

Related U.S. Application Data

(60) Provisional application No. 61/243,807, filed on Sep. 18, 2009.

(51) Int. Cl.
*G05D 3/12* (2006.01)
(52) U.S. Cl.
USPC .......................................................... 700/298
(58) Field of Classification Search
USPC .......................................................... 700/298
See application file for complete search history.

(56) References Cited

U.S. PATENT DOCUMENTS

| | | | |
|---|---|---|---|
| 7,116,010 B2 | 10/2006 | Lasseter et al. | |
| 7,256,566 B2 | 8/2007 | Bhavaraju et al. | |
| 7,465,872 B1 | 12/2008 | de Rooij et al. | |
| 7,502,241 B2 | 3/2009 | Taylor | |
| 7,535,120 B2 * | 5/2009 | Erdman et al. | 307/47 |
| 7,626,834 B2 | 12/2009 | Chisenga et al. | |
| 7,929,327 B2 * | 4/2011 | Haines et al. | 363/95 |

(Continued)

FOREIGN PATENT DOCUMENTS

| | | |
|---|---|---|
| EP | 2053730 | 4/2009 |
| GB | 2434490 | 7/2007 |

(Continued)

OTHER PUBLICATIONS

E. Wu and P. W. Lehn, "Digital current control of a voltage source converter with active damping of LCL resonance," IEEE Transactions on Power Electronics, vol. 21, No. 5, Sep. 2006, pp. 1364-1373.

(Continued)

*Primary Examiner* — Mohammad Ali
*Assistant Examiner* — Sivalingam Sivanesan
(74) *Attorney, Agent, or Firm* — Stephen J. Scribner

(57) ABSTRACT

Described herein are methods, systems, and apparatus for a controller for a power circuit that interfaces distributed power generation with a power distribution grid, comprising: a first portion, including a maximum power point tracker, that receives signals corresponding to the distributed power generation voltage and current, and outputs to the power circuit a signal for controlling the voltage of the distributed power generation; a second portion, including a current reference generator, a current controller, and a dc voltage controller, that receives signals corresponding to a dc voltage of the power circuit, the power distribution grid voltage and current, and the inverter current, and outputs signals for controlling the power circuit output voltage; wherein the current reference generator includes nonlinear circuit elements and generates a current reference signal from the dc voltage of the power circuit and the grid voltage and current; such that substantially harmonic-free power is injected into the power distribution grid. The distributed power generation may be, for example, a photovoltaic module or a wind turbine.

23 Claims, 25 Drawing Sheets

(56) References Cited

U.S. PATENT DOCUMENTS

| | | | |
|---|---|---|---|
| 8,018,748 B2 * | 9/2011 | Leonard | 363/95 |
| 8,189,352 B2 * | 5/2012 | Egiziano et al. | 363/35 |
| 8,390,243 B2 * | 3/2013 | Wu et al. | 320/101 |
| 2005/0180175 A1 | 8/2005 | Torrey et al. | |
| 2008/0055941 A1 | 3/2008 | Victor et al. | |
| 2008/0122293 A1 | 5/2008 | Ohm | |
| 2008/0192510 A1 | 8/2008 | Falk | |
| 2008/0205096 A1 | 8/2008 | Lai et al. | |
| 2008/0266922 A1 | 10/2008 | Mumtaz et al. | |
| 2008/0278983 A1 | 11/2008 | Park | |
| 2009/0027932 A1 * | 1/2009 | Haines et al. | 363/95 |
| 2009/0080226 A1 | 3/2009 | Fornage | |
| 2009/0116266 A1 | 5/2009 | Lai et al. | |
| 2010/0195357 A1 * | 8/2010 | Fornage et al. | 363/55 |
| 2010/0236612 A1 | 9/2010 | Khajehoddin et al. | |
| 2011/0026281 A1 * | 2/2011 | Chapman et al. | 363/65 |
| 2011/0153113 A1 * | 6/2011 | Harnefors | 700/298 |
| 2011/0261593 A1 | 10/2011 | Pan et al. | |
| 2011/0264288 A1 | 10/2011 | Khajehoddin et al. | |
| 2012/0019071 A1 * | 1/2012 | Lin et al. | 307/65 |

FOREIGN PATENT DOCUMENTS

| | | |
|---|---|---|
| JP | 10155280 A | 6/1998 |
| JP | 2003037939 | 7/2001 |
| KR | 1020060070172 | 2/2008 |
| KR | 1020070023977 | 9/2008 |
| KR | 1020090004983 | 1/2009 |
| WO | WO2006/048688 | 5/2006 |
| WO | WO2006/048689 | 5/2006 |
| WO | WO2007/080429 | 7/2007 |
| WO | WO2007/105858 | 9/2007 |

OTHER PUBLICATIONS

Blaabjerg, F.; Teodorescu, R.; Liserre, M.; Timbus, A.V.; "Overview of Control and Grid Synchronization for Distributed Power Generation Systems," IEEE Transactions on Industrial Electronics, vol. 53 , Issue: 5 , 2006, pp. 1398-1409.

Newman, M.J.; Holmes, D.G.; "Delta operator digital filters for high performance inverter applications," IEEE Transactions on Power Electronics, vol. 18 , Issue: 1 , Part: 2, 2003 , pp. 447-454.

Kauraniemi, J.; Laakso, T.I.; Hartimo, I.; Ovaska, S.J.; "Delta operator realizations of direct-form IIR filters," IEEE Transactions on Circuits and Systems II: Analog and Digital Signal Processing, vol. 45 , Issue: 1 , 1998 , pp. 41-52.

Gabe, I.J.; Montagner, V.F.; Pinheiro, H.; "Design and Implementation of a Robust Current Controller for VSI Connected to the Grid Through an LCL Filter," IEEE Transactions on Power Electronics, vol. 24 , Issue: 6 , 2009 , pp. 1444-1452.

Karimi-Ghartemani, M.; Iravani, M.R.; "A nonlinear adaptive filter for online signal analysis in power systems: applications," IEEE Transactions on Power Delivery, vol. 17, Issue: 2, 2002, pp. 617-622.

Sung Yeul Park; Chien Liang Chen; Jih Sheng Lai; Seung Ryul Moon; "Admittance Compensation in Current Loop Control for a Grid-Tie LCL Fuel Cell Inverter," IEEE Transactions on Power Electronics, vol. 23 , Issue: 4, 2008 , pp. 1716-1723.

Fei Liu; Yan Zhou; Jinjun Yin; Shanxu Duan; "Design and research on two-loop control strategy of PV grid-connected inverter with LCL filter,"International Conference on Electrical Machines and Systems, 2008. pp. 2644-2649.

Teodorescu, R.; Blaabjerg, F.; Borup, U.; Liserre, M.; "A new control structure for grid-connected LCL PV inverters with zero steady-state error and selective harmonic compensation," Nineteenth Annual IEEE Applied Power Electronics Conference and Exposition, 2004, pp. 580-586 vol. 1.

Timbus, A.; Liserre, M.; Teodorescu, R.; Rodriguez, P.; Blaabjerg, F.; "Evaluation of Current Controllers for Distributed Power Generation Systems," IEEE Transactions on Power Electronics, vol. 24 , Issue: 3, 2009 , pp. 654-664.

Castilla, M.; Miret, J.; Matas, J.; de Vicua, L.G.; Guerrero, J.M.; "Linear Current Control Scheme With Series Resonant Harmonic Compensator for Single-Phase Grid-Connected Photovoltaic Inverters," IEEE Transactions on Industrial Electronics, vol. 55 , Issue: 7, 2008 , pp. 2724-2733.

Blasko, V.; Kaura, V.; "A novel control to actively damp resonance in input LC filter of a three-phase voltage source converter," IEEE Transactions on Industry Applications, vol. 33 , Issue: 2 , 1997 , pp. 542-550.

Teodorescu, R.; Blaabjerg, F.; Liserre, M.; Loh, P.C.; "Proportional-resonant controllers and filters for grid-connected voltage-source converters,"IEE Proceedings Electric Power Applications, vol. 153 , Issue: 5, 2006 , pp. 750-762.

PCT International Search Report for International Application No. PCT/CA2010/001466 filed on Sep. 17, 2010.

PCT Written Opinion of the International Searching Authority for International Application No. PCT/CA2010/001466 filed on Sep. 17, 2010.

\* cited by examiner

DISTRIBUTED POWER GENERATION INTERFACE

RELATED APPLICATIONS

This application claims the benefit of the filing date of U.S. Provisional Patent Application No. 61/243,807, filed Sep. 18, 2009, the contents of which are incorporated herein by reference in their entirety.

FIELD OF THE INVENTION

This invention relates to circuits, systems, and methods for interfacing distributed electrical power generation, such as wind turbines and photovoltaic cells and modules, with a power distribution grid.

BACKGROUND

Distributed power generation, such as used with wind turbines and photovoltaic (PV) cells or modules, is becoming an important renewable energy resource. Such power generation may be connected to the power distribution grid in various configurations of three basic elements, namely inverters, output filters, and controls. All approaches have advantages and disadvantages and compromise various attributes such as harmonic and noise rejection capability, simplicity, efficiency, flexibility, reliability, safety, modularity, and cost.

SUMMARY

Described herein is a controller for a power circuit that interfaces distributed power generation with a power distribution grid, comprising: a first portion, including a maximum power point tracker, that receives signals corresponding to the distributed power generation voltage and current, and outputs to the power circuit a signal for controlling the voltage of the distributed power generation; a second portion, including a current reference generator, a current controller, and a dc voltage controller, that receives signals corresponding to a dc voltage of the power circuit and the power distribution grid voltage and current and the inverter current, and outputs signals for controlling and/or changing the power circuit output voltage; wherein the current reference generator includes nonlinear circuit elements and generates a current reference signal from the dc voltage of the power circuit and the grid voltage and/or current; such that substantially harmonic-free power is injected into the power distribution grid. In one embodiment, the current reference generator generates a current reference signal from the dc voltage of the power circuit and the grid voltage.

In one embodiment, the current reference generator: i) includes an instantaneous power calculator that generates an instantaneous power reference signal, and (ii) generates the current reference signal from the instantaneous power reference signal and the grid voltage and current using nonlinear circuit elements.

The controller may include an enhanced phase locked loop (EPLL). The EPLL may provide a phase angle of the grid voltage which is used to generate the instantaneous power reference signal.

In one embodiment, the instantaneous power calculator may calculate the instantaneous power from real and reactive power commands. The real and reactive power commands may be set externally. The real power command may be generated by an internal PI controller operating on dc-link voltage error or on dc link energy error. The reactive power command may be generated by an internal PI controller operating on voltage magnitude error.

In one embodiment, the current reference generator comprises a capacitor energy calculator, a notch filter, and at least one PI controller, and may further include an EPLL. The EPLL may generate parallel and orthogonal signals corresponding to the grid voltage. The notch filter may operate at double frequency.

In one embodiment, a first PI controller operates on an error between (i) a reference energy signal and (ii) an actual energy signal corresponding to the dc voltage of the power circuit, and multiplies a PI output with the parallel signal from the EPLL to generate a real current component of the current reference signal.

In one embodiment, a second PI controller operates on an error between (i) a reference reactive power signal and (ii) an actual reactive power signal corresponding to the output power of the power circuit, and multiplies a PI output with the orthogonal signal from the EPLL to generate a reactive component of the current reference signal.

The current controller may include a semi-state feedback control structure combined with a resonant-type output feedback portion. The current controller may include a semi-state feedback control structure combined with a resonant-type output feedback portion and a feed forward portion operating on the grid voltage in order to achieve soft-start operation. The current controller may include a semi-state feedback combined with one or more resonant-type output feedback portions, wherein each resonant-type output feedback portion may correspond to a harmonic of the grid voltage. The current controller may include a semi-state feedback control structure combined with a resonant-type output feedback portion and a soft-start feed forward controller.

The current controller may include a semi-state feedback control structure combined with a resonant-type output feedback portion and an integrating controller operating on the grid current signal to remove a dc component from the injected current. The current controller may include a semi-state feedback control structure combined with a resonant-type output feedback portion and one or more resonant-type controllers operating on the grid current signal to remove selected harmonics from injected current and reject those harmonics that may come from a reference current signal. The current controller may include a semi-state feedback control structure combined with a resonant-type output feedback portion and a wide band harmonic controller in parallel or in series with the resonant-type controller to suppress all harmonics within a wide range of frequencies. The current controller may include a semi-state feedback control structure combined with a resonant-type output feedback portion and a wide band feed forward harmonic compensator operating on the grid voltage to suppress all harmonics within a wide range of frequencies. The current controller may include a semi-state feedback control structure combined with a resonant-type output feedback portion and any combination of the aforementioned control and compensation structures.

The current controller may include one or more resonant-type harmonic controllers acting on grid current. The current controller may include an integrating controller acting on grid current. The current controller may include a wide band harmonic controller in parallel with the resonant-type controller or in series with the resonant-type controller. The wide band harmonic controller may have a proportional, proportional-derivative, lead, or lead-lag configuration. The current controller may include a wide band feed forward harmonic compensator acting on the grid voltage signal. The wide band feed forward harmonic compensator may have a proportional, proportional-derivative, lead, or lead-lag configuration. The current controller may include portions of any of the above controllers, alone or in combination.

Also described herein is a micro-inverter system for interfacing distributed power generation with a power distribution grid, comprising a controller as described herein and a power circuit including an inverter.

In one embodiment, the current controller controls flow of substantially harmonic-free power through an output filter of the power circuit. The filter may be an inductor. The filter may include a combination of inductive and capacitive elements. The filter may be an LCL.

Also described herein is a PV module including a micro-inverter system as described herein.

Also described herein is a method for controlling a power circuit that interfaces distributed power generation with a power distribution grid, comprising: controlling a voltage of the distributed power generation using signals corresponding to the distributed power generation voltage and current; generating a current reference signal and controlling the power circuit output voltage using signals corresponding to (i) a dc voltage of the power circuit and (ii) the power distribution grid voltage and current; wherein generating the current reference signal includes using a current reference generator with nonlinear circuit elements; such that substantially harmonic-free power is injected into the power distribution grid. Generating a current reference signal and controlling the power circuit output voltage may include using signals corresponding to (i) a dc voltage of the power circuit and (ii) the power distribution grid voltage and current and the inverter current.

The power circuit output voltage may be controlled by controlling an inverter of the power circuit. The inverter may be a current source inverter or a voltage source inverter.

In one embodiment, the method may include generating an instantaneous power reference signal, and generating the current reference signal from the instantaneous power reference signal and the grid voltage and current using nonlinear circuit elements. The method may include using a phase angle of the grid voltage to generate the instantaneous power reference signal.

In one embodiment, the method includes using a phase locked loop or an EPLL to provide the phase angle of the grid voltage.

The method may include calculating the instantaneous power from real and reactive power commands. The method may include setting the real and reactive power commands externally. The method may include generating the real power command by an internal PI controller operating on a dc-link voltage error. The method may include generating the reactive power command by an internal PI controller operating on a voltage magnitude error.

In another embodiment, the method may include generating parallel and orthogonal signals corresponding to the grid voltage. The method may include generating a real current component of the current reference signal from an error between a reference energy signal and an actual energy signal corresponding to the dc voltage of the power circuit, multiplied with the parallel signal. The method may include generating a reactive component of the current reference signal from an error between a reference reactive power signal and an actual reactive power signal corresponding to the output power of the power circuit, multiplied with the orthogonal signal. The method may include using an EPLL to generate the parallel and orthogonal signals corresponding to the grid voltage.

In another embodiment, the method may include using a semi-state feedback control structure combined with a resonant-type output feedback portion in the current controller, or using a semi-state feedback control structure combined with two or more resonant-type output feedback portions in the current controller. Each resonant-type output feedback portion may correspond to a harmonic of the grid voltage. The method may further include using a feed forward soft start controller. The method may include using one or more resonant-type controllers acting on the grid current. The method may include using an integrating controller acting on the grid current. The may include using a wide band harmonic controller in parallel with the resonant controller. The method may include using a wide band harmonic controller in series with the resonant controller. The wide band harmonic controller may have a proportional, proportional-derivative, lead, or lead-lag configuration. The method may include using a wide band feed forward harmonic compensator acting on the grid voltage. The wide band feed forward harmonic compensator may have a proportional, proportional-derivative, lead, or lead-lag configuration.

In the aspects, embodiments, and methods described herein, the distributed power generation may include at least one PV module, or at least one wind turbine, or a combination thereof, and the inverter may be a current source inverter or a voltage source inverter.

BRIEF DESCRIPTION OF THE DRAWINGS

For a better understanding of the invention, and to show more clearly how it may be carried into effect, embodiments will now be described, by way of example, with reference to the accompanying drawings, wherein.

DETAILED DESCRIPTION OF EMBODIMENTS

Figure 1:
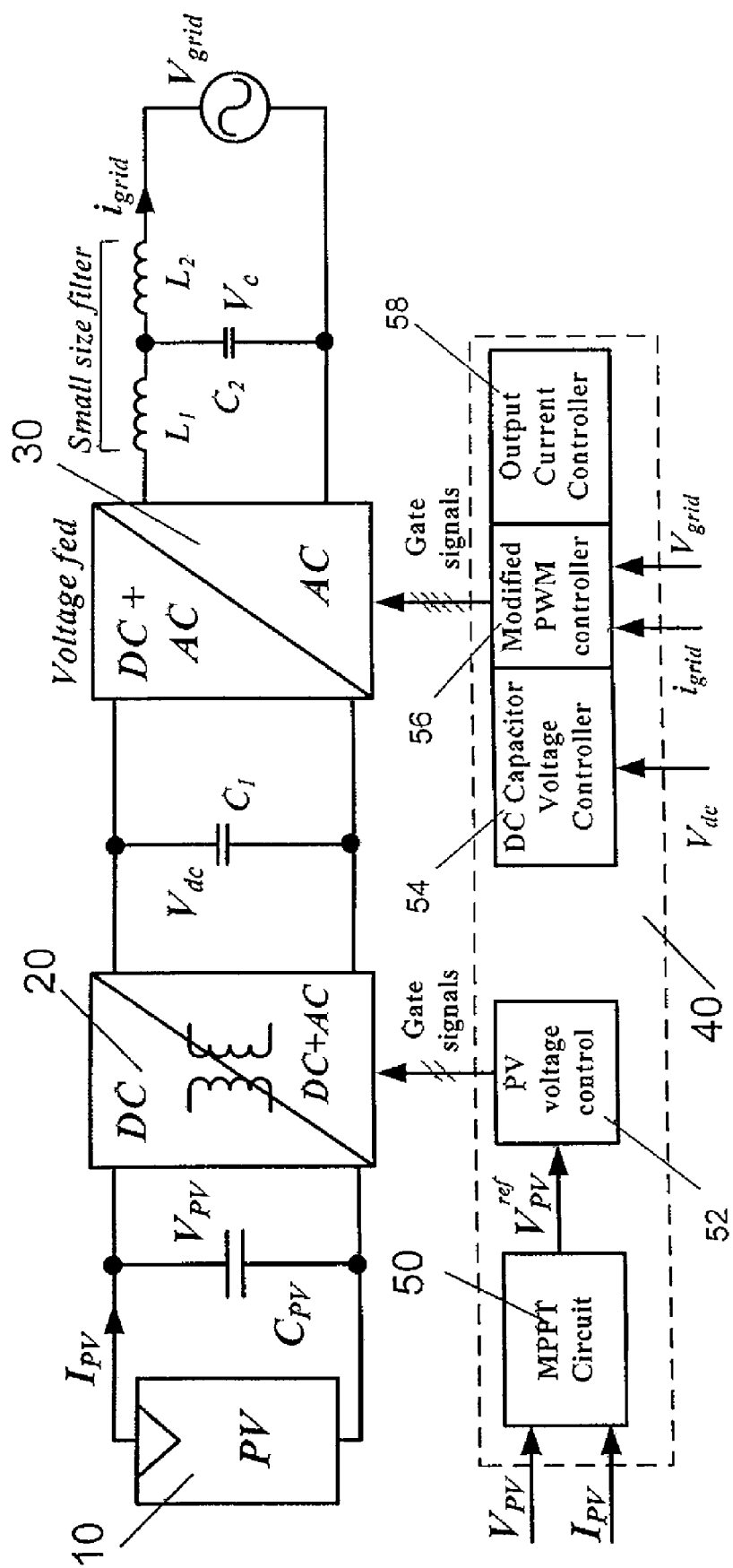
FIG. 1 shows a block diagram of a micro-inverter system applied to a PV module, according to an embodiment.

Distributed power generation may be connected to the power distribution grid in various configurations of three basic elements, namely inverters, output filters, and controls. Selection of inverter topology and output filter has a direct impact on the overall system performance and its operation. Higher order filters, for example, can significantly reduce the size and weight of circuit components but at the same time they may cause stability problems. A powerful control system is then required to overcome such problems and recover the desired performance for the system. Such a control system may require sensors to measure system variables so that appropriate control can be accomplished. To reduce complexity and cost, a minimum number of measuring sensors should be employed. However, currently available solutions have complex hardware and control systems, which make the overall system expensive, and do not maximize the efficiency of power extraction from the power generators.

Described herein is a system for interfacing distributed power generation with a power distribution grid. The system, which is also referred to herein as a "micro-inverter system", includes a power section and a controller section. The power section includes an inverter for obtaining power from one or more distributed power generators, and injecting the power into the grid. In one embodiment, the distributed power generator is one or more PV cells or modules. The power section also includes an output filter to attenuate the switching ripple at the output current of the inverter. The output filter may be a simple inductor (L), or a combination of one or more inductor and one or more capacitor (C), such as, for example, an LCL filter, or any similar higher order filter. The controller section controls output power from the inverter and ensures the injection of high quality (i.e., substantially phased matched and substantially free of harmonics) power into the grid. That is, the power injected into the grid complies with national or international power authority specifications and standards for power quality, including total harmonic distortion (THD) and phase matching. For example, the techniques described herein may be applied to distributed power generation so that the THD of the current is less than 5%, less than 4%, less than 3%, less than 2%, or less than 1%, as prescribed by the power authority specifications and standards.

Although embodiments of the invention are described herein primarily with respect to a power distribution grid, it will be understood that the invention is not limited thereto. That is, embodiments may be used in stand-alone applications, wherein the interface is between the power generation and an electrical load. An example of a stand-alone application is an off-grid application. In a stand-alone embodiment, the voltage and current of the load may be sensed and used to condition the power delivered to the load, using techniques as described herein, or variations thereof.

To increase the overall efficiency of a distributed power generation system under different circumstances, independent control and power extraction is required for each power generator. For example, for a distributed power generation using PV modules, partial shadowing of the PV modules and/or mismatches between PV modules are factors requiring independent control and power extraction to maximize overall efficiency of the system.

This may be achieved in accordance with the aspects and embodiments described herein by using a separate micro-inverter system including a power section and a controller section for each PV panel. Typically, the micro-inverter system is compact and robust, so that it may be attached to a PV panel. The micro-inverter system does not require costly high voltage dc wiring and is suitable for distributed power generation applications such as PV modules, where partial shading of PV modules cannot be avoided, since maximum power point tracking (MPPT) is performed on each PV module independently. The micro-inverter system avoids mismatch losses between PV modules. Due to the modularity of this technology, PV modules may be added in a "plug and play" manner. In addition, the micro-inverter system may be mass-produced, which lowers the cost. Further, at least portions of the system may be implemented using a FPGA, which makes it even more compact and robust.

As used herein, the term "dc" refers to direct current, and is equivalent to the term "DC".

As used herein, the terms "PV cell" and "PV module" are used interchangeably and are equivalent.

As used herein, the term "command" refers to a reference signal.

As used herein, the term "distributed power generation" refers to power generation that is distributed with respect to the power distribution grid. Examples of distributed power generation include, but are not limited to, PV modules and arrays thereof, and wind turbines and arrays thereof.

It will be appreciated that, although embodiments are described herein primarily with respect to PV modules, the embodiments may be applied to, or adapted for use with, other types of distributed power generation, such as wind turbines.

An embodiment of a micro-inverter system for interfacing distributed power generation with a power distribution grid is shown in the block diagram of FIG. 1. This embodiment includes a power section including an input capacitor $C_{PV}$ connected across the PV cell(s) 10, a first stage 20 connected across the input capacitor, a second capacitor $C_1$ connected across the first stage output, a second stage 30 including an inverter, and an output LCL filter, including $L_1$, $C_2$, and $L_2$. The first stage 20 may include one or more switches and is used to regulate the input capacitor $C_{PV}$ voltage, removing input voltage oscillation and avoiding the need for a large input capacitor. In the embodiment of FIG. 1, a controller section 40 includes a maximum power point tracker 50 and circuits to control the power flow to the grid by generating gate signals to drive the switches in the first stage 20 and the second stage 30. For example, the controller section 40 includes a stage 52 for controlling the PV output voltage $V_{PV}$, a stage 54 for controlling the dc capacitor voltage $V_{dc}$, a modified pulse width modulation (PWM) controller 56, and an output current controller 58 for controlling power injection to the distribution grid, as shown in FIG. 1 and explained below.

The second stage 30 of the power section of the micro-inverter system may include a current source inverter (CSI) or a voltage source inverter (VSI). For example, a voltage source inverter may be connected to the grid using a simple inductive filter or a higher order filter such as an LCL filter. Such filters attenuate switching frequency ripples, generated by the inverter, transferred to the injected current. For a simple L filter the attenuation is 20 log($\omega_s L$) dB. For example, for a value of L=10 mH and fs=50 kHz, the attenuation is about 70 dB. A higher order output filter may be used to provide the same level of filtering (or more) while requiring much smaller circuit elements. Consider, for example, an LCL filter with inductance $L_1$ (inverter side), capacitance $C_2$, and inductance $L_2$ (grid side), as shown in FIG. 1. It can be shown that for $L_1 = L_2 = 220$ μH and $C_2 = 2.2$ μF, such filter acts like a single inductance equal to L=10 mH at a switching frequency of 50 kHz. The LCL filter thus substantially reduces the size of circuit components. For instance, in this example the size of the inductors may be reduced by about 22.7 times.

Figure 2:
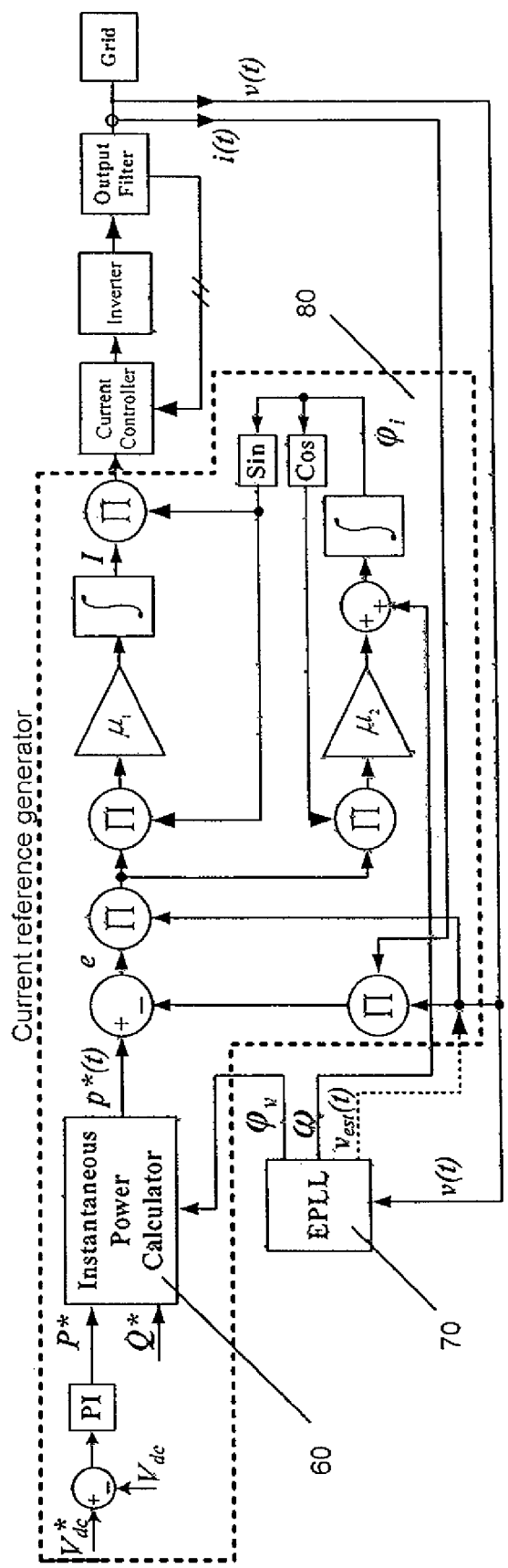
FIG. 2 shows a block diagram of the microinverter and a current reference generator of a controller section of a micro-inverter system such as that shown in FIG. 1, according to an embodiment.

Another embodiment of a system for interfacing distributed power generation with a power distribution grid as described herein is shown in the block diagram of FIG. 2. FIG. 2 shows details of an embodiment of the controller section. In general, the controller section includes an instantaneous power reference calculator 60, an enhanced phase-locked loop (EPLL) 70, which calculates $\phi_v$, and a reference current generator 80 whose task is to calculate the reference current for the micro-inverter. Such reference current is properly adjusted in a closed-loop (nonlinear) mechanism to ensure that accurate active (i.e., real) and reactive power levels are injected into the grid. In the embodiment of FIG. 2, the instantaneous power reference calculator 60 receives commands of active and reactive powers and generates an instantaneous power reference signal.

Figure 11:
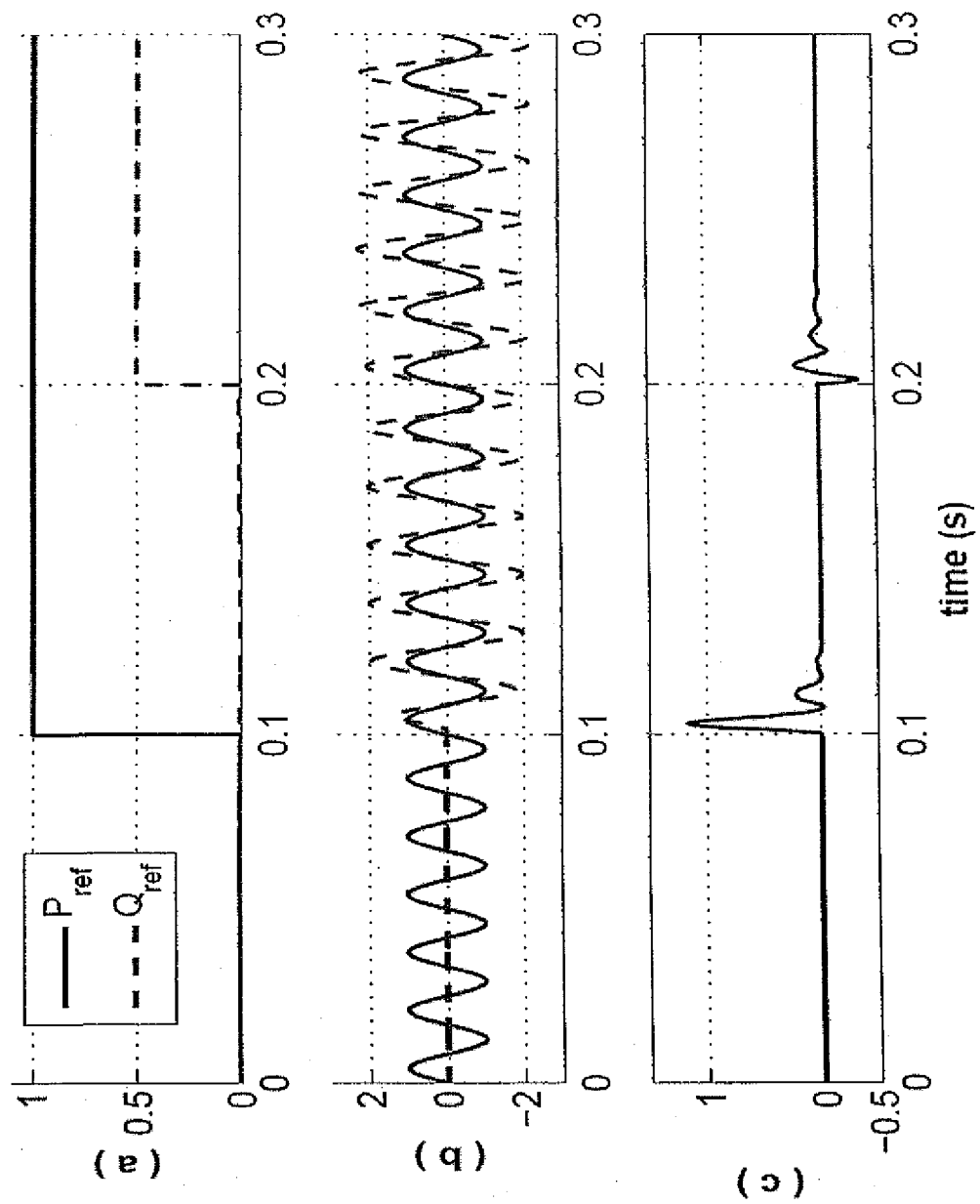
FIG. 11 shows the performance of the micro-inverter system in tracking active and reactive power commands: (a) active and reactive commands; (b) grid voltage (solid) and current (dashed); (c) instantaneous power error.

It is noted that conventional approaches only consider generation of real power, whereas the embodiments described herein may provide generation of both real and reactive power. The reactive power control is often required in stand-alone applications and micro-grid systems, where load reactive power demand can only be supplied by the DG system in the absence of the utility system. The generation of both real and reactive powers is achieved without requiring any additional circuitry. The reference for active power may be generated by, for example, a simple PI controller acting on the error of the dc capacitor voltage, $V_{dc}$. A sample performance result is shown in FIG. 11, where FIG. 11(a) shows the reference active and reactive power signals, FIG. 11(b) shows the grid current (dashed) and voltage (solid) signals, and FIG. 11(c) shows the instantaneous power error.

Figure 3:
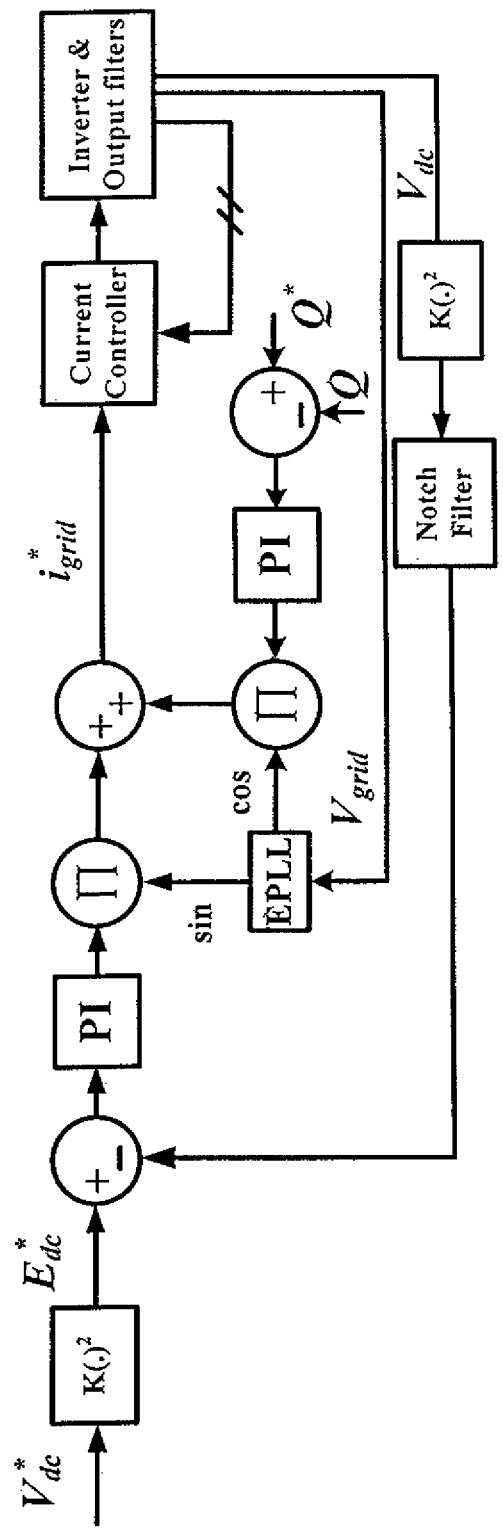
FIG. 3 shows a block diagram of the microinverter and a controller section of a micro-inverter system such as that shown in FIG. 1, according to another embodiment.
Figure 14:
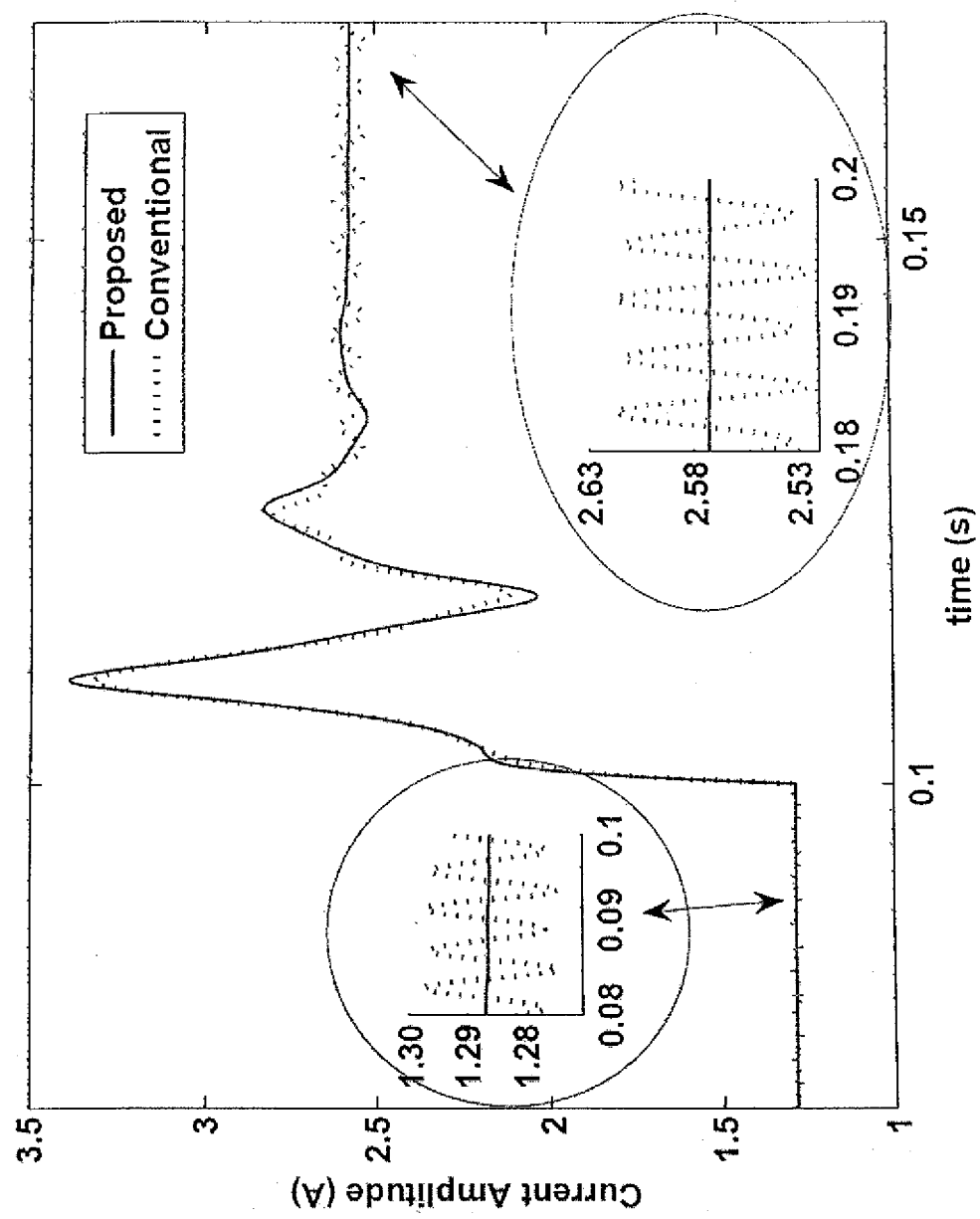
FIG. 14 shows the amplitude of the output current of an embodiment of the micro-inverter system (solid) and a conventional design (dashed) when the input power steps from 100 W to 200 W.

Another embodiment of a controller section as described herein is shown in the block diagram of FIG. 3. A feature of this controller is control of the dc link energy, rather than the dc link voltage, as is done in conventional methods. In FIG. 3 the constant K is equal to $0.5 C_1$ in order to generate energy variable from voltage. However, in general the constant can be any arbitrary number that has been included in the controller design. As a result of using an energy variable, the control loop becomes linear, while in conventional approaches, the control loop is nonlinear. (The detailed mathematical proof is given below.) A nonlinear loop requires linearization for design purposes and limits the performance and stability of the controller for large signal variations. Usage of dc-link energy as a control variable rather than dc-link voltage has two advantages: One advantage is to facilitate design of a set of parameters that ensure global stability. The second advantage originates from the fact that the dc-link energy has only double-frequency ripples while the dc-link voltage has double-frequency and also higher-order ripples. Thus, the notch filter used in this embodiment (see FIG. 3) completely blocks the ripples when the energy signal is used. FIG. 14 shows the amplitude of the output current for the conventional method (dashed) and the embodiment (solid) of the control technique when the input power steps from 100 W to 200 W. It can be seen that in the conventional method the amplitude of the current has fourth order harmonics which translate into $3^{rd}$ and $5^{th}$ order harmonics on the grid current.

Another feature of the controller section embodiment of FIG. 3 is the independent control over active and reactive powers. This is accomplished by the voltage quadrature signal provided by the enhanced phase locked loop (EPLL). The reference for the reactive power Q* is either externally set or is calculated by processing (e.g., by using a PI controller) the output voltage magnitude and/or frequency error(s) in stand-alone or micro-grid applications. The actual output reactive power can be calculated using the data provided by the voltage EPLL and another EPLL for the output current (not shown in FIG. 3) or using low-pass or notch filters. It will be appreciated that the reactive power control loop is optional, and is mostly useful for stand-alone applications.

Figure 4:
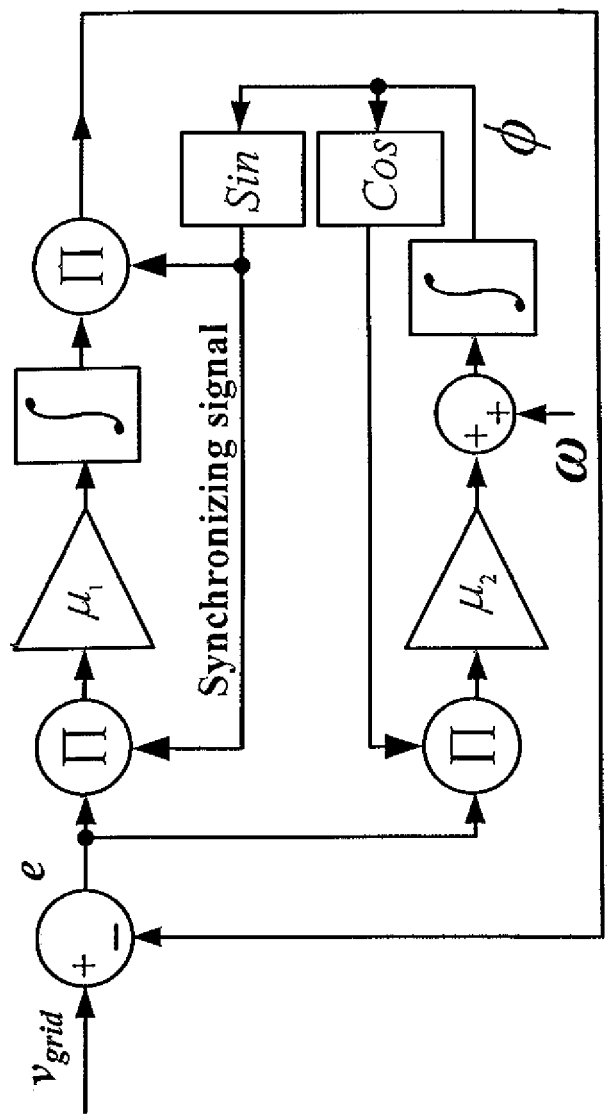
FIG. 4 shows a block diagram of an embodiment of an enhanced phase locked loop (EPLL) block for a controller section such as that shown in FIG. 2 or 3.
Figure 16A:
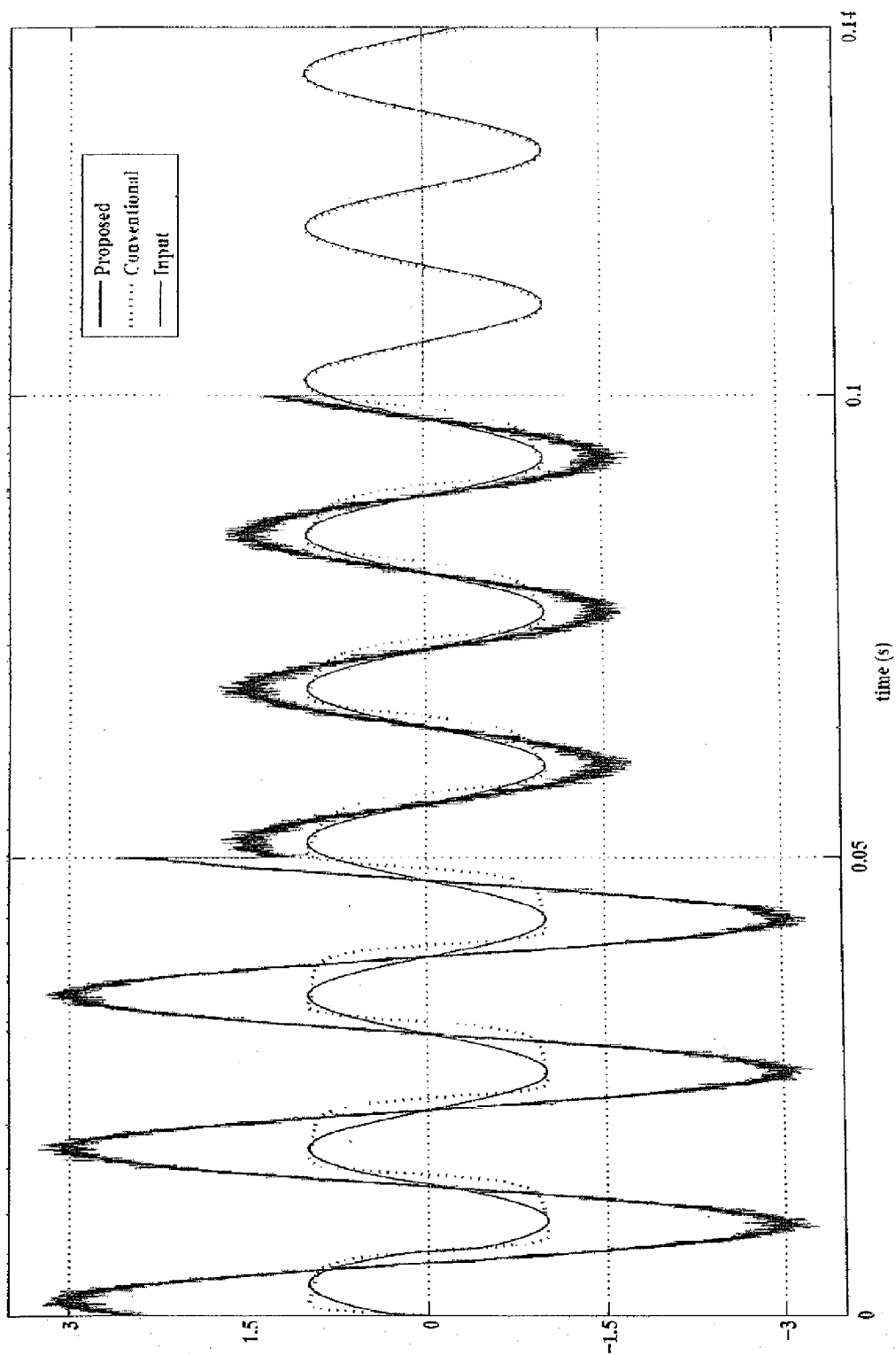
FIGS. 16A and 16B show graphical results comparing performances of the EPLL and conventional PLL.
Figure 16B:
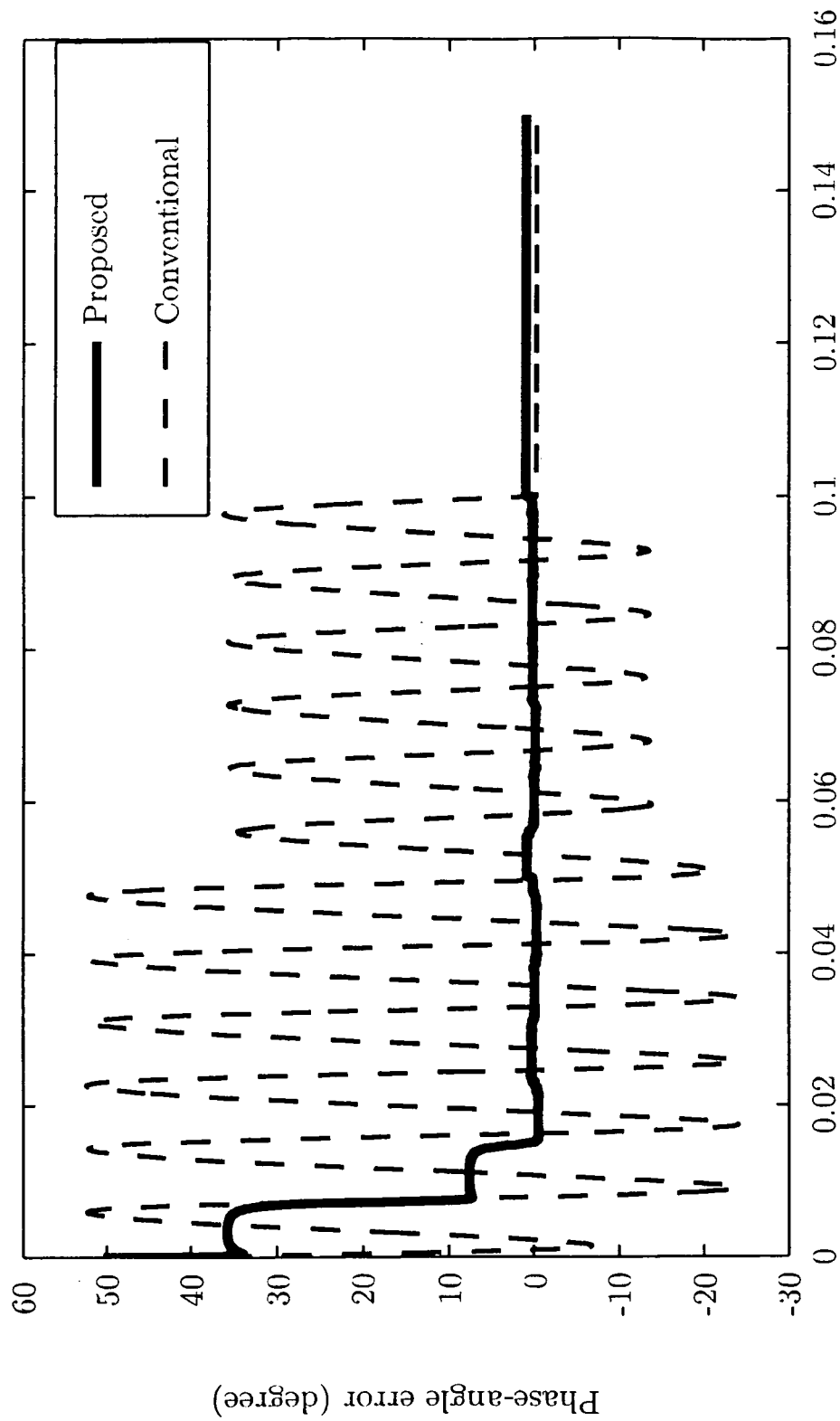

A block diagram of EPLL portion is shown in FIG. 4. The EPLL estimates $\phi_v$ and $\omega$ from the measured voltage signal. The EPLL avoids harmful double-frequency ripples. Such ripples are the main shortcoming of conventional single-phase PLL systems which negatively affect accuracy of their operation. The EPLL provides an accurate reference for synchronization even in the short-term absence of the input signal. This is a desirable feature in cases where there are short interruptions in the measurement system and if there is outage in the system. FIGS. 16A and 16B show results obtained from an EPLL and a conventional PLL. The input is a noisy sinusoidal signal with changing magnitude that vanishes at t=0.1 s. The synchronization signal provided by the EPLL is accurate, whereas the synchronization signal provided by the conventional PLL has large double frequency ripples and has a large offset when the input signal vanishes. When the input signal is absent, the output of the EPLL also has a tiny offset in the phase but the extent of this offset may be controlled by compromising the amplitude estimation feature. Further, the EPLL provides another signal that is orthogonal to the synchronizing reference. Such a signal, called a quadrature signal, may be used for reactive power control as shown in FIG. 3. The EPLL is also able to estimate amplitude of its input signal; another feature of the reactive power control loop in the embodiment of FIG. 3.

It will be appreciated that the complexity of the controller section is no greater than that of existing techniques, with the added advantage that a controller as described herein provides flexible and independent control over both real and reactive power. A controller such as that shown in FIGS. 2 and 3 is suitable for digital implementation. The EPLL and the current reference generator may have similar structure, which simplifies sequential digital circuit implementations in FPGA because once the EPLL structure is implemented; the same approach may be used for the current reference generator in a finite-state machine design.

According to one embodiment, the controller section controls the behavior of an LCL filter connected between the inverter and the power distribution grid. The need for such control of the LCL filter arises because of the resonance among the LCL circuit components. Damping of this resonance mode is zero in a pure LCL filter, which means that the circuit will show oscillations at its natural resonance frequency. In practice, the resistive nature of the components provides some damping, although the poor damping still results in oscillations being generated by the filter. There are two ways to overcome this problem: (1) Passive Damping. In this method, a certain amount of resistance is added to the LCL components to increase damping of the resonant mode. Such resistors, however, dissipate energy and increase losses. (2) Active Damping. In this method, an appropriate control strategy is used to introduce adequate damping to the resonant modes. This approach is used in an embodiment of the controller section described below.

The control strategy plays a significant role in obtaining desirable performance when an LCL filter is used. The filter is of third order and has three state variables. The current injected to the grid is the most important variable and is controlled carefully. The objective is to maintain this current as a substantially harmonic free sinusoidal signal at 60 Hz for all system operating conditions and all system uncertainties and changes in parameters. Detailed explanations regarding system conditions and requirements are given as follows.

Different system operating conditions stem from the fact that the power generation is an intermittent or variable source, such as a PV module or a wind turbine. This phenomenon causes a wide range of current levels and other system variables for which the controller must be able to operate.

The filter is connected to the power distribution grid which is an infinite bus. Such an infinite bus, however, may show different impedances to the filter depending on the location the filter is being tied to. This phenomenon generates large uncertainties on the grid-side inductor of the filter.

The power distribution grid voltage at the point of coupling is often assumed to be a pure sinusoid, which is not necessarily the case. The injected current must be smooth and must comply with the level of allowed harmonics despite the presence of grid voltage distortions.

A typical grid often experiences some variations in its frequency. The controller must be able to operate in synchrony with the grid despite such variations. This issue is even more troublesome in weak grid systems or is landed systems.

Components of the system may have nonlinearities, which can cause current distortion. The controller must be able to minimize adverse impacts of those phenomena on the quality of injected current.

The circuit components may undergo changes due to temperature and/or aging. The controller must perform robustly against such changes.

The resonance phenomenon of the LCL filter should be controlled to avoid undesirable oscillations during various operating conditions of the system.

Figure 5:
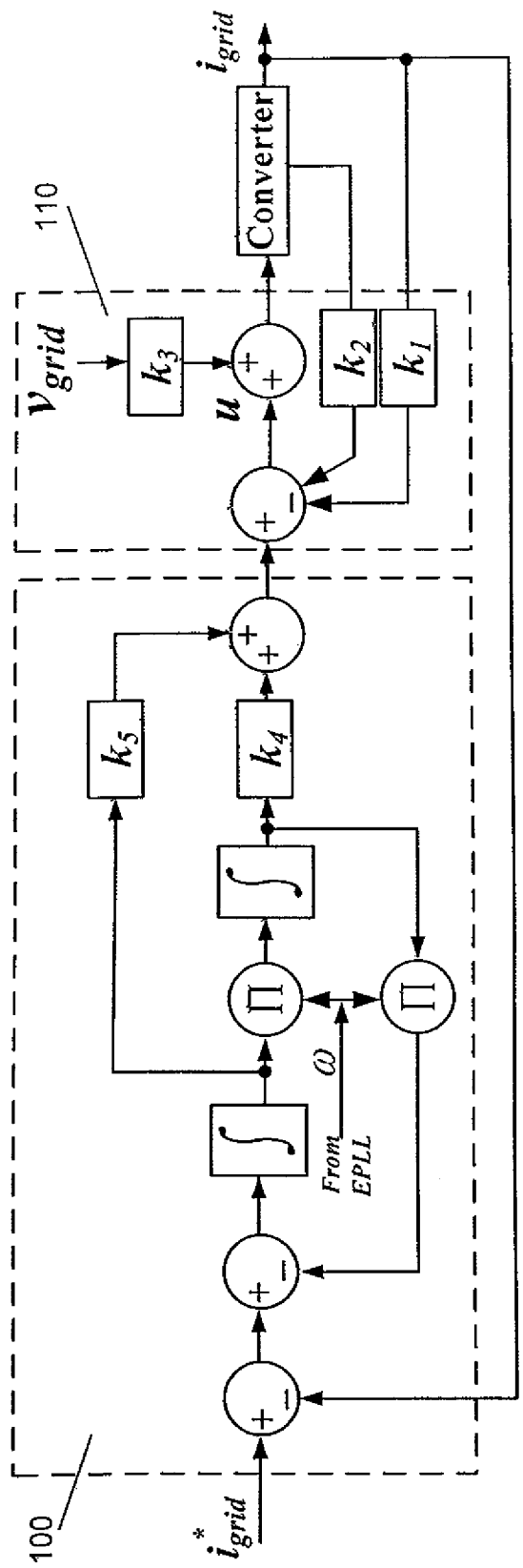
FIG. 5 shows a block diagram of a closed-loop feedback scheme used in an embodiment of the current controller portion of the controller section, designed using the improved LQR method described herein.

It is challenging to design a standard feedback loop on the grid current to obtain stable and robust performance of the closed-loop system, due to the marginal stability of the LCL filter. Thus, in one embodiment, a semi-state-feedback strategy combined with an output feedback loop may be used, as shown in FIG. 5. The controller section includes an internal loop 110, which feeds back grid current and inverter current, and an external loop 100, which ensures tracking of a pure sinusoidal current without error. The feed forward term from grid voltage in the internal loop 110 does not have any impact on the stability properties of the control loop operation. It is used to achieve a soft-start operation. (Mathematical equations to design this term are included herein.) The microinverter output filter capacitor voltage $V_C$ (see FIG. 1) is not used as a feedback signal in the internal loop, to avoid excessive usage of sensors. Analysis of the design shows that the controller section operates desirably without using the capacitor voltage. A state estimator may also be used to estimate the grid current from the measurements of inverter current. This also obviates the need to sense the grid current.

Figure 7:
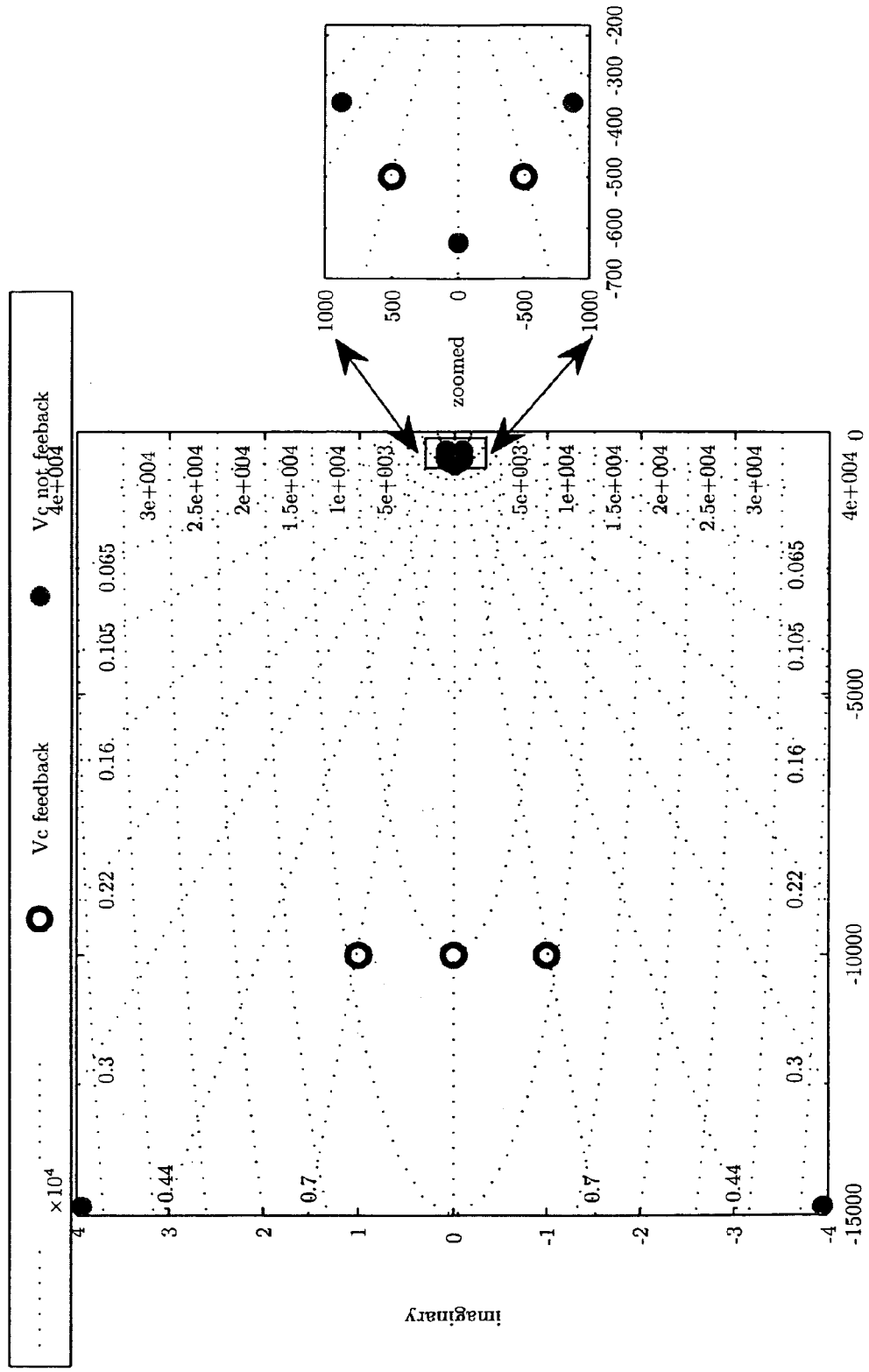
FIG. 7 is a plot showing deviation in location of closed-loop poles when the output filter capacitor voltage is or is not used as a feedback signal, in a traditional state feedback design.

Standard state-feedback techniques assume that all state variables are used for feedback. Thus, the closed-loop poles deviate from their pre-specified locations if the capacitor voltage gain is set to zero. The deviation is in the direction of the reduction of the response speed and the reduction of the damping of resonances, as can be seen in FIG. 7, which shows deviation of closed-loop poles for cases where $V_C$ is used, and where $V_C$ is not used.

Figure 8A:
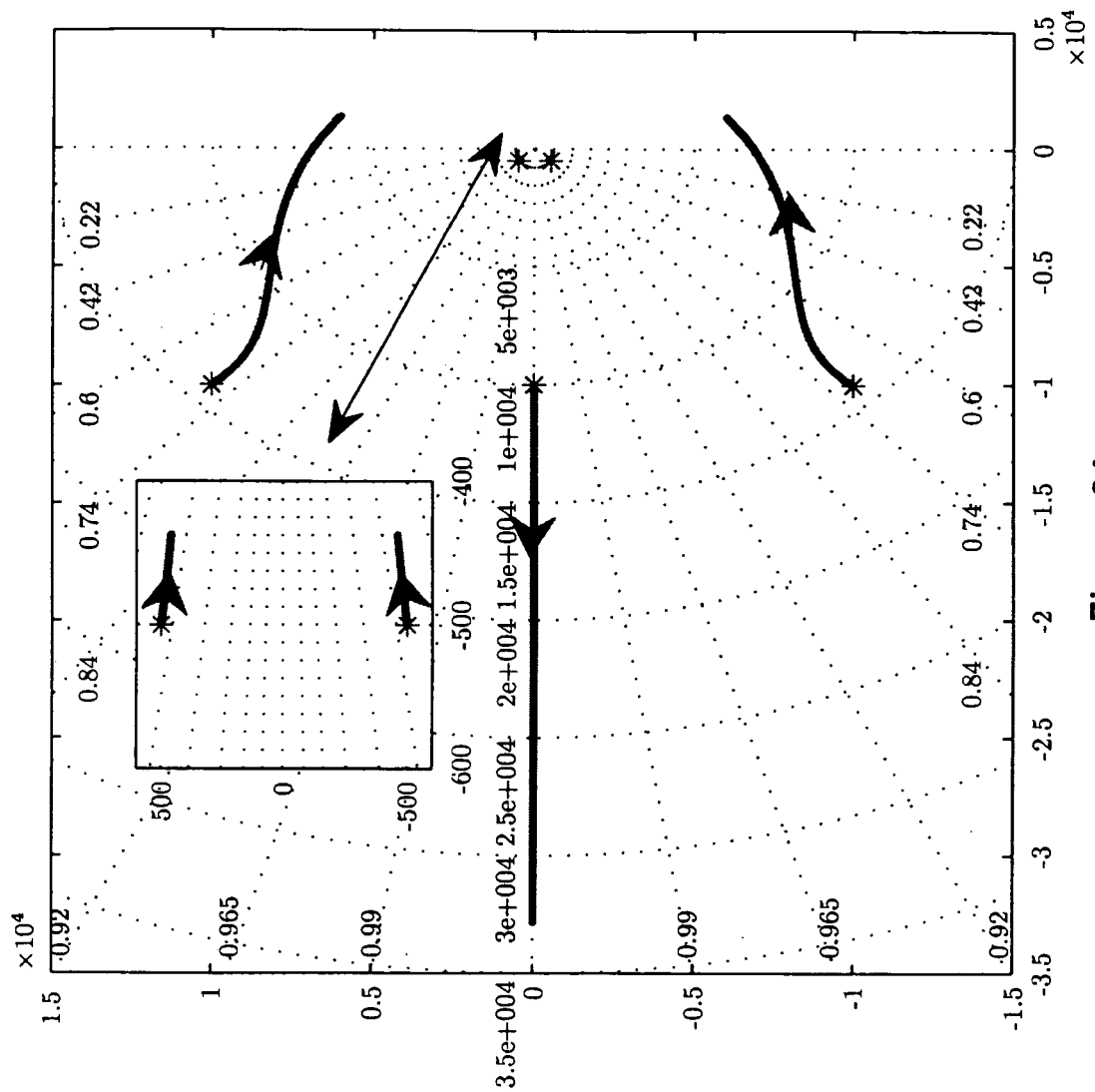
FIG. 8A is a plot showing sensitivity and instability of a conventional controller to grid-side inductance changes from 0.5 mH to 1 mH.
Figure 8B:
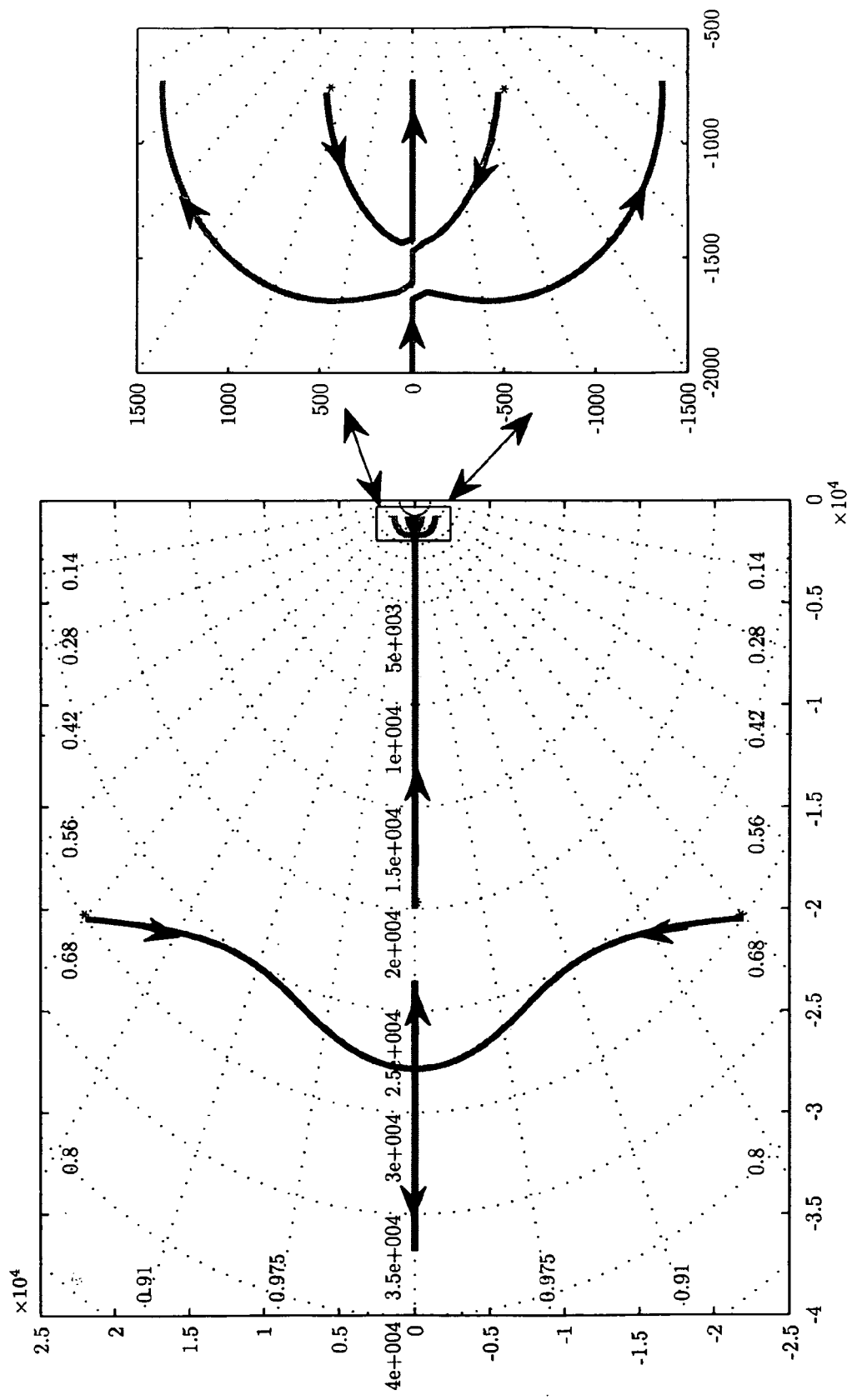
FIG. 8B is a plot showing robustness and stability of an embodiment of the controller section to grid-side inductance changes from 0.5 mH to 20 mH.

Investigations show that the standard pole-assignment technique of state-feedback theory is not ideal for designing the controller gains, for various reasons. An appropriate set of locations for closed-loop poles is challenging to obtain, and the closed-loop system will become sensitive to system uncertainties, calculation delays, and to estimation accuracy, and will exhibit poorly damped resonance oscillations. For example, the impact of uncertainties on the grid-side inductor $L_2$ (i.e., a change from 0.5 mH to 1 mH), is shown in FIG. 8A. This shows that an increase in the grid-side inductor makes the closed-loop system unstable. In contrast, the performance of the embodiment of FIG. 5 against large uncertainties in the grid-side inductor (i.e., a 40× change from 0.5 mH to 20 mH), is shown in FIG. 8B. It can be seen that the controller handles very large uncertainty levels without instability.

The embodiment uses optimal control techniques and optimally assigns the closed-loop poles to locations which meet control objectives. An improved version of a linear quadratic regulation (LQR) technique was developed and used to suit a single-phase PV application. The improvement involved solving the tracking problem rather than the regulation problem. Moreover, a resonant-type controller 100 as shown in FIG. 5 was incorporated to ensure zero steady-state error. Coefficients of this controller were optimally obtained using the improved LQR technique as discussed below. One major difficulty with using the conventional LQR technique is the correct adjustment of its Q matrix. Described herein is a systematic method of finding elements of the Q matrix to arrive at a desirable response.

To clarify the method some mathematical proofs are given here. The LCL filter may be described by the following state-space equations in which the index p stands for plant, $x_p$ is the state vector defined as $x_p = [i_t, v_c, i_g]^T$, and y is the output of interest which is $i_g$.

$$\dot{x}_p = A_p x_p + B_p u + B_1 v_g$$

$$y = C_p x_p \quad (1)$$

The matrices are given by:

$$A_p = \begin{pmatrix} 0 & -\frac{1}{L_1} & 0 \\ \frac{1}{C} & 0 & -\frac{1}{C} \\ 0 & \frac{1}{L_2} & 0 \end{pmatrix}, B_p = \begin{pmatrix} \frac{M}{L_1} \\ 0 \\ 0 \end{pmatrix}, \quad (2)$$

$$B_1 = \begin{pmatrix} 0 \\ 0 \\ \frac{1}{L_2} \end{pmatrix}, C_p = (0 \ 0 \ 1)$$

where M is the PWM gain. Resonant-type controllers (R controller) are described by the following state-space equations:

$$\dot{x}_r = A_r x_c + B_r e \quad (3)$$

where the index r stands for resonant, $x_r$ is the state vector of R controller and e is the error of the injected current. The matrices are given by $$A_r = \begin{pmatrix} 0 & -\omega_o \\ \omega_o & 0 \end{pmatrix}, \quad (4)$$

$$B_r = \begin{pmatrix} 1 \\ 0 \end{pmatrix}$$

where $_o$ is the system frequency. The state variables of the R controller, in the Laplace domain, are $$X_r(s) = (sI - A_r)^{-1} B r = \frac{E(s)}{s^2 + \omega_o^2} \begin{pmatrix} s \\ \omega_o \end{pmatrix} \quad (5)$$

and thus satisfy the following equations in the time domain $$\ddot{x}_{r1} + \omega_o^2 x_{r1} = \dot{e}$$

$$\ddot{x}_{r2} + \omega_o^2 x_{r2} = \omega_o e \quad (6)$$

The LCL filter and the R controller, when combined together, make up a fifth order system which may be described by the following state-space equations $$\dot{x} = Ax + Bu + B_2 v_g + B_3 Y_{ref}$$

$$y = Cx \quad (7)$$

where $x = [x_p, x_r]^T$ is the vector of state variables, $y_{ref}$ is the reference signal and the matrices are given below.

$$A = \begin{pmatrix} A_p & 0 \\ -B_r C_p & A_r \end{pmatrix}, B = \begin{pmatrix} B_p \\ 0 \end{pmatrix}, B_2 = \begin{pmatrix} B_1 \\ 0 \end{pmatrix}, B_3 = \begin{pmatrix} 0 \\ B_r \end{pmatrix} \quad (8)$$

Note that the control signal u may be expressed as $$u = -[K_1 0 K_2] x_p - [K_3 K_4] x_r = -[K_1 0 K_2 K_3 K_4] x = -Kx \quad (9)$$

which is in the standard form of a state-feedback law. The only difference here is that one of the feedback gains, corresponding to the capacitor voltage, is set to zero. The combined system (described by matrices A and B) is completely controllable.

Equation set (1) describes the closed-loop control system. In (1), $y_{ref}$ is the reference signal for the grid current. This signal is provided by the reference generation unit and is a pure sinusoidal signal at frequency of 60 Hz. It thus satisfies the equation ref+$y_{ref}$=0. The grid voltage $v_g$ also satisfies this equation if we assume that the grid is stiff. The above discussion amounts to the fact that if the differential operator $D^2$+ is applied to both sides of (1), $v_g$ and $y_{ref}$ disappear and the following simplified equation is obtained.

$$\dot{z} = Az + Bv \quad (10)$$

In (10), the new state vector z and the new control signal v are defined as z=+x and v=u. The new variables (z and v) characterize the deviation of the original variables from a pure sinusoid at frequency More specifically, the new state vector corresponding to the R controller is $$z_r = \ddot{x}_r + \omega_o^2 x_r = \begin{pmatrix} \dot{e} \\ \omega_o e \end{pmatrix} \quad (11)$$

in which the equality is inferred based on (6). The state-feedback control law (9) may also be used to obtain a similar law for the new control signal as $$v = -Kz. \quad (12)$$

Equations (10) and (12) describe a standard regulation problem in which the objective is to regulate the state variables to "zero". As a matter of fact the above transformations on the state variables and control signal transformed the tracking problem into a regulation problem. Such a problem can optimally be addressed using the technique of LQR. The LQR technique provides the best controller gains that minimize a quadratic cost function expressed below.

$$J = \int_0^\infty (z^T Q z + v^2) dt = \int_0^\infty (q_5 \omega_o^2 e^2 + q_4 \dot{e}^2 + z_p^T Q_p z_p + v^2) dt \quad (13)$$

Matrix Q is positive semi-definite. The solution is obtained from the Algebraic Riccati Equation (ARE) and is conveniently calculated in Matlab™ using the procedure K=1qr(A, B,Q,1).

The LQR technique transforms the problem of selecting closed-loop poles into selecting the matrix Q. This matrix is a diagonal non-negative matrix and thus it has the same number of elements as those of the controller gains K, i.e. Q=diag($q_1$, $q_2, q_3, q_4, q_5$). However, unlike selection of closed-loop poles, selection of Q is performed with the clear view that increasing each element $q_i$ has its eminent effect on decreasing the deviation of state variable $z_i$ from zero. Thus, often an easy trial and error stage can lead to a suitable selection, which results in desirable behavior of the closed-loop system. Moreover, in this method, the designer is not worried about closed-loop instability because the stability is guaranteed for any choice of non-negative Q.

Figure 9A:
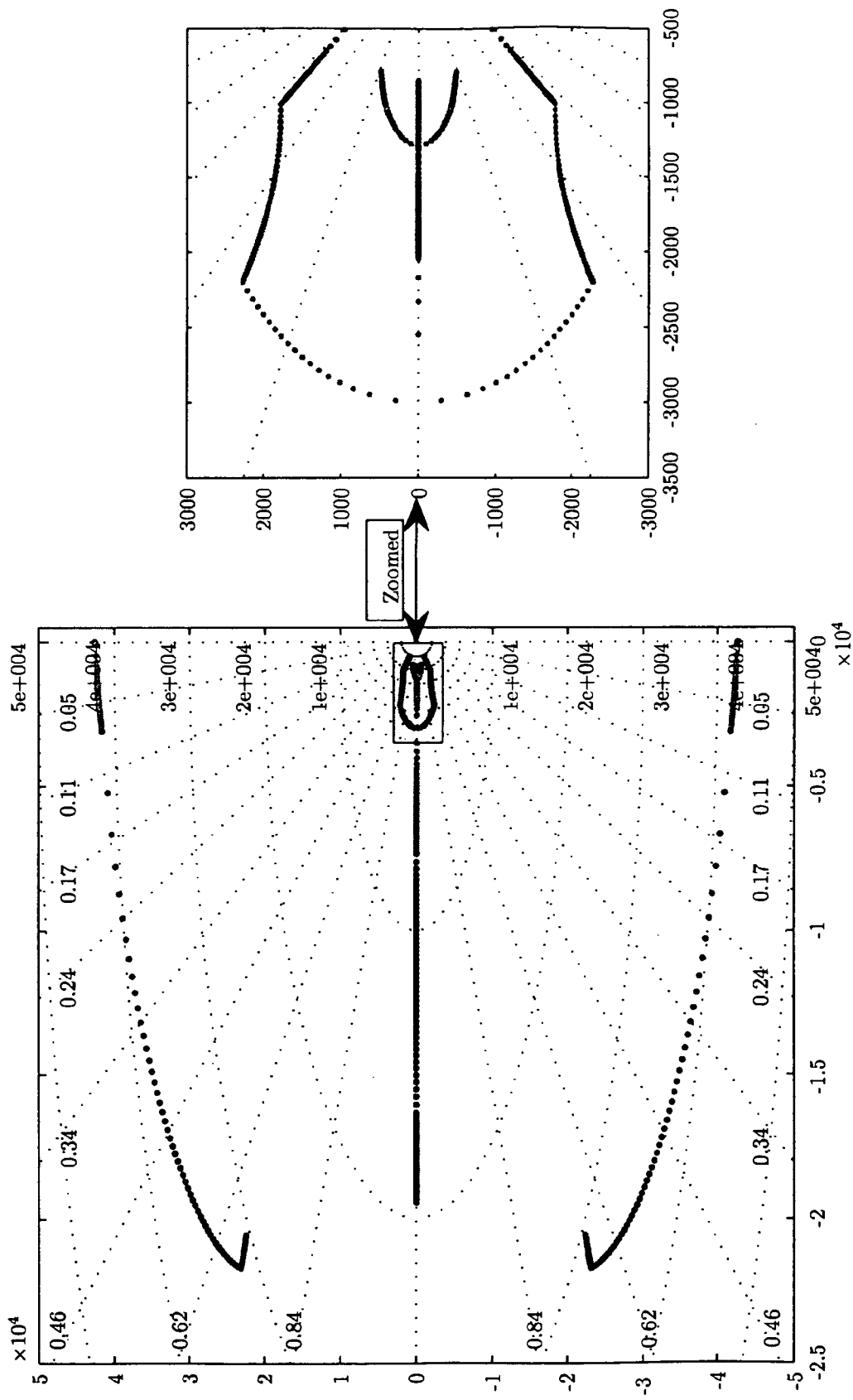
FIG. 9A shows the locus of closed loop poles as designed using the improved LQR method described herein.
Figure 9B:
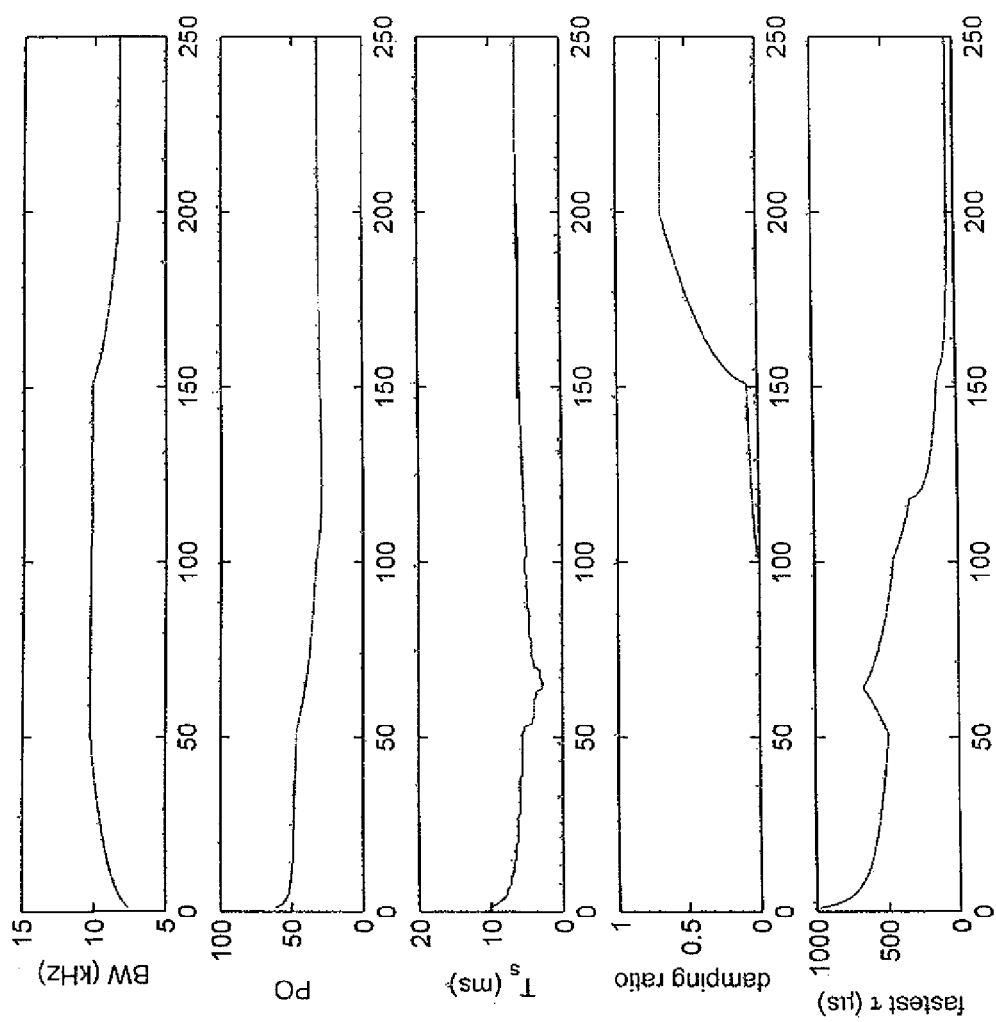
FIG. 9B shows the evolution of the response characteristics of the closed loop system for different design iterations.

It is observed from (13) that $q_5$ controls the tracking error and has the most significant impact on generating a desirable response. The coefficient $q_4$ controls the rate of change of the tracking error and may be used to make the system responses smoother. Further adjustments are possible by using $q_3$, $q_2$ and $q_1$. The systematic method used herein is to start increasing $q_5$ from an initial positive value while all the other coefficients are set to zero. Once $q_5$ reaches a certain value, it becomes frozen and then $q_4$ starts to increase. The system responses together with the location of closed-loop poles and zeros are monitored while the q coefficients are being increased. The design is ended once a desirable response is achieved. A typical root-locus curve is shown in FIG. 9A and the evolvement of system response characteristics is shown in FIG. 9B.

For every selection of Q, the closed-loop poles are arranged and placed at a specific location in such a way that the cost function (13) is minimized. Such a solution is called optimal. This means that not any blind selection of closed-loop poles would necessarily correspond to an optimal solution. A feature of the LQR technique is that it guarantees those locations of the closed-loop poles which are optimal. Such an optimality also corresponds to certain degrees of system robustness in terms of classical concepts of phase-margin and gain-margin, as well-known in the art. FIG. 8B shows a similar situation to that of FIG. 8A. Unlike the conventional state feedback design that becomes unstable for an uncertainty as small as 0.5 mH in $L_2$, the technique described herein maintains the stability for very large uncertainties, i.e., as large as 20 mH or greater.

It is a feature of the improved LQR design method described herein the infinite-time tracking problem is addressed. Such a problem has not previously been addressed in a closed form formulation. Solutions for the finite-time tracking problem are known, as are the challenges that occur when the infinite time is concerned. The technique described herein effectively resolves the challenges.

The feed forward term on the grid voltage is included to achieve soft-start operation. The closed-loop state-space equations are $$\dot{x} = Ax + Bu + B_2 v_{grid} + B^3 i_{grid}^{ref}$$

$$y = Cx_1 \qquad (14)$$

where the matrices are given below.

$$A = \begin{bmatrix} A_p & 0 \\ -B_c C_p & A_c \end{bmatrix}, B = \begin{bmatrix} B_p \\ 0 \end{bmatrix}, \qquad (15)$$

$$B_z = \begin{bmatrix} B_1 \\ 0 \end{bmatrix}, B_3 = \begin{bmatrix} 0 \\ B_c \end{bmatrix}, C = [C_p, 0]$$

According to the control structure, the control signal is $$u = -K_p x_p - K_c x_c - k_{FF} v_{grid}. \qquad (16)$$

That generates the following description for the closed-loop system:

$$\dot{x} = \begin{bmatrix} A_p - B_p K_p & B_p K_c \\ -B_c C_p & A_c \end{bmatrix} \begin{bmatrix} x_p \\ x_c \end{bmatrix} + \begin{bmatrix} B_1 - k_{FF} B_p \\ 0 \end{bmatrix} v_{grid} + \begin{bmatrix} 0 \\ B_c \end{bmatrix} i_{grid}^{ref} \qquad (16)$$

The response of the output current to the grid voltage is calculated from the following equation:

$$i_{grid}(t) = Cx(t) = C \int_0^t e^{A(t-\tau)} \begin{bmatrix} B_1 - k_{FF} B_p \\ 0 \end{bmatrix} v_{grid}(\tau) d\tau. \qquad (17)$$

To optimize the feed forward term to achieve soft start operation, the following norm is defined for minimization:

$$\min \|i_{grid}(t)\|^2 = \min \int_0^{T_f} i_{grid}^2(t) dt. \qquad (18)$$

The norm can be calculated from well-known linear analysis theory as shown in the following equation:

$$\int_0^{T_f} i_{grid}^2(t)dt = \int_0^{T_f} C e_{A_t}(\Lambda \bot \Lambda_1^T - 2k_{FF} \Lambda \bot \Lambda_2^T | k_{FF}^2 \Lambda_2 \Lambda_2^T) e^{A^T t} C^T dt, \qquad (19)$$

Where the matrices are defined below:

$$\Lambda_1(t) = \int_0^t e^{-A\tau} \begin{bmatrix} B_1 \\ 0 \end{bmatrix} v_{grid}(\tau) d\tau, \qquad (20)$$

$$\Lambda_2(t) = \int_0^t e^{-A\tau} \begin{bmatrix} B_p \\ 0 \end{bmatrix} v_{grid}(\tau) d\tau.$$

Therefore, the optimum gain can be derived by differentiation and making it equal to zero:

$$k_{FF} = \frac{\int_0^{T_f} C e^{At} \Lambda_1 \Lambda_2^T e^{A^T t} C^T dt}{\int_0^{T_f} C e^{At} \Lambda_2 \Lambda_2^T e^{A^T t} C^T dt}. \qquad (21)$$

Figure 17:
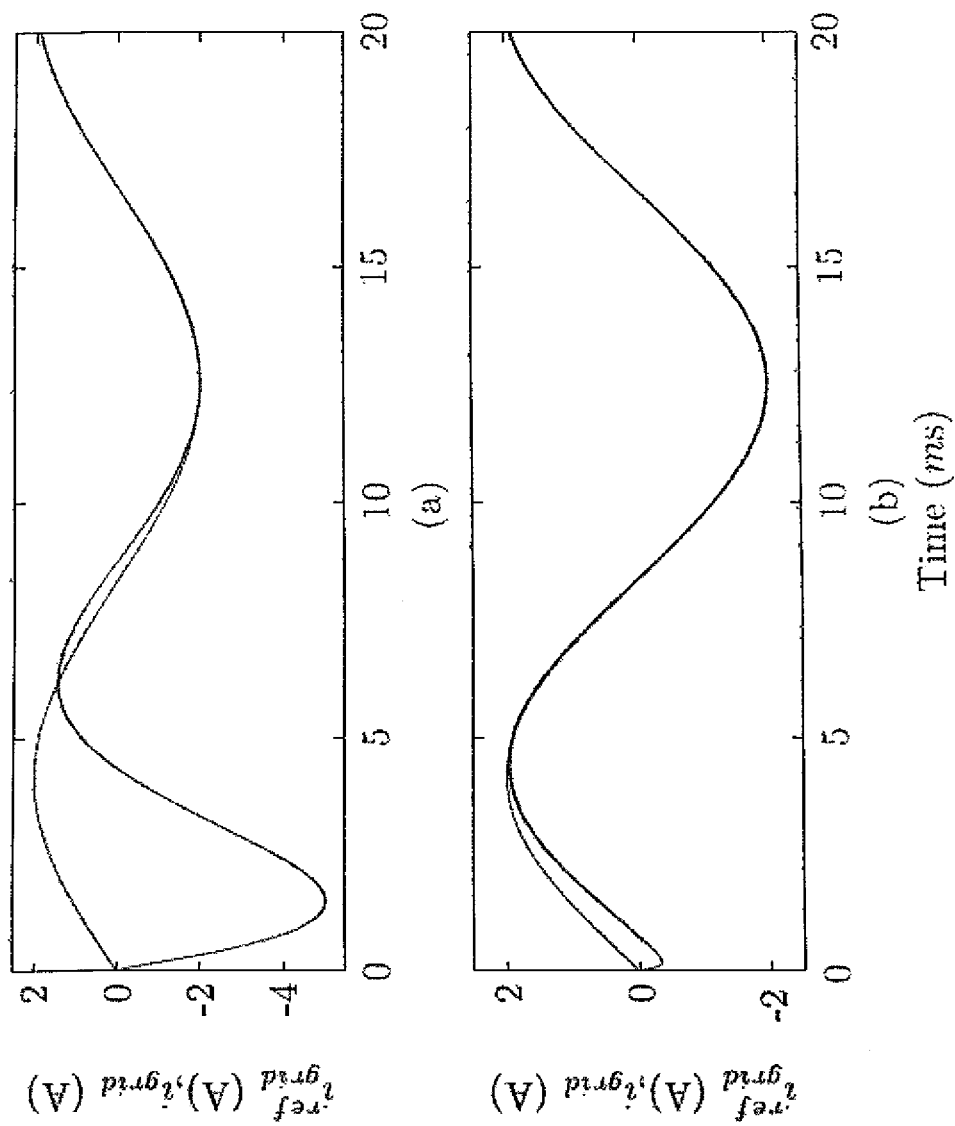
FIG. 17 shows performance of the system without and with a soft start feed forward controller as described herein.

A sample simulation is presented in FIG. 17 where the system output current responses are shown for the case where the start-up term is included and for the case where the start-up term is not included. It is observed that the feed forward term contributes to smoothing of the startup stage of the system.

Figure 6A:
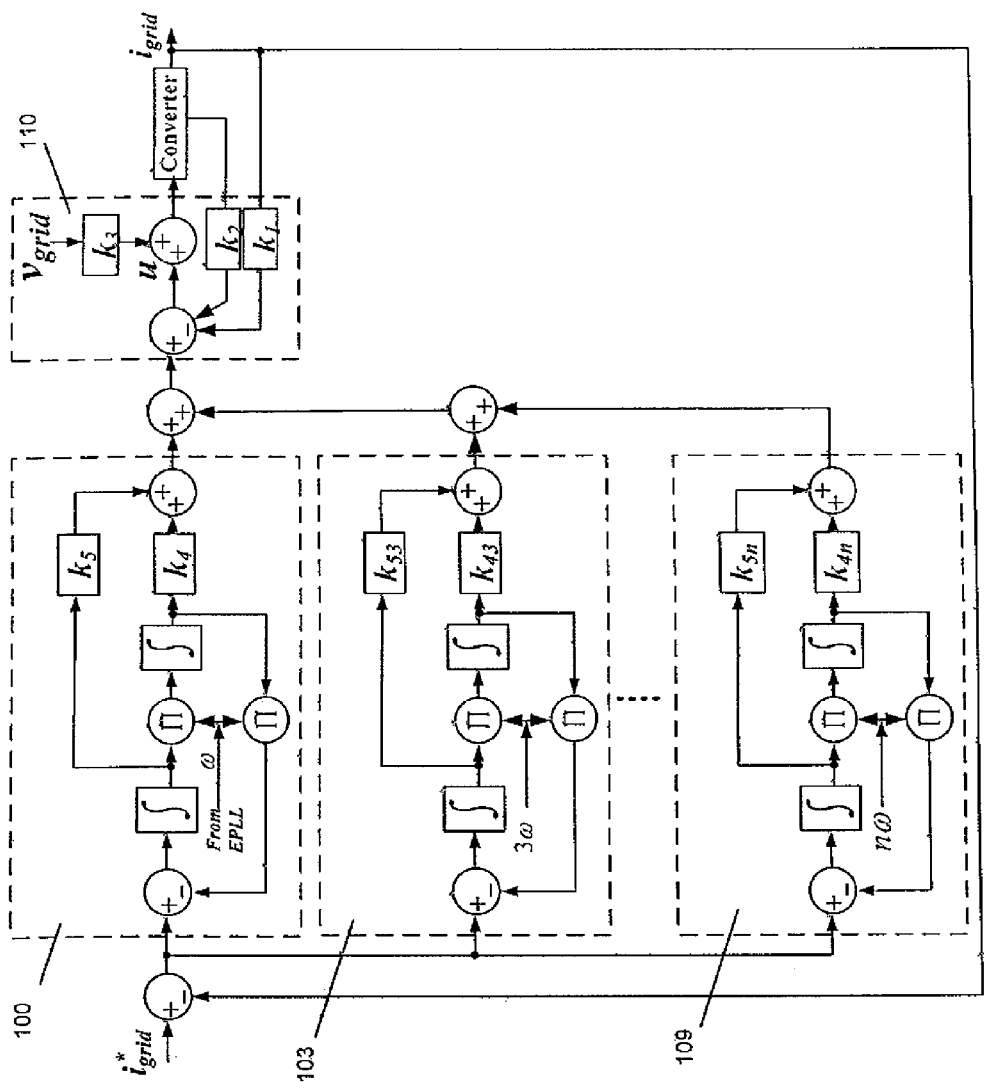
FIG. 6A shows a block diagram of a closed-loop feedback scheme used in an embodiment of the current controller portion of the controller section, designed using the improved LQR method for distorted grid voltage as described herein.

According to another embodiment of the controller section shown in FIG. 6A, a further improvement minimizes impacts of grid voltage distortion on the quality of the injected current. The improvement was made by incorporating multiple resonant controllers 103 and 109 in the outer feedback loop as shown in FIG. 6A. The design of such controllers may also be accomplished using the improved LQR technique as discussed above. Such a design involves adjustment of several controller coefficients that is very challenging using conventional techniques. The method described herein facilitates such a design in a very convenient way without any instability concern.

Figure 10A:
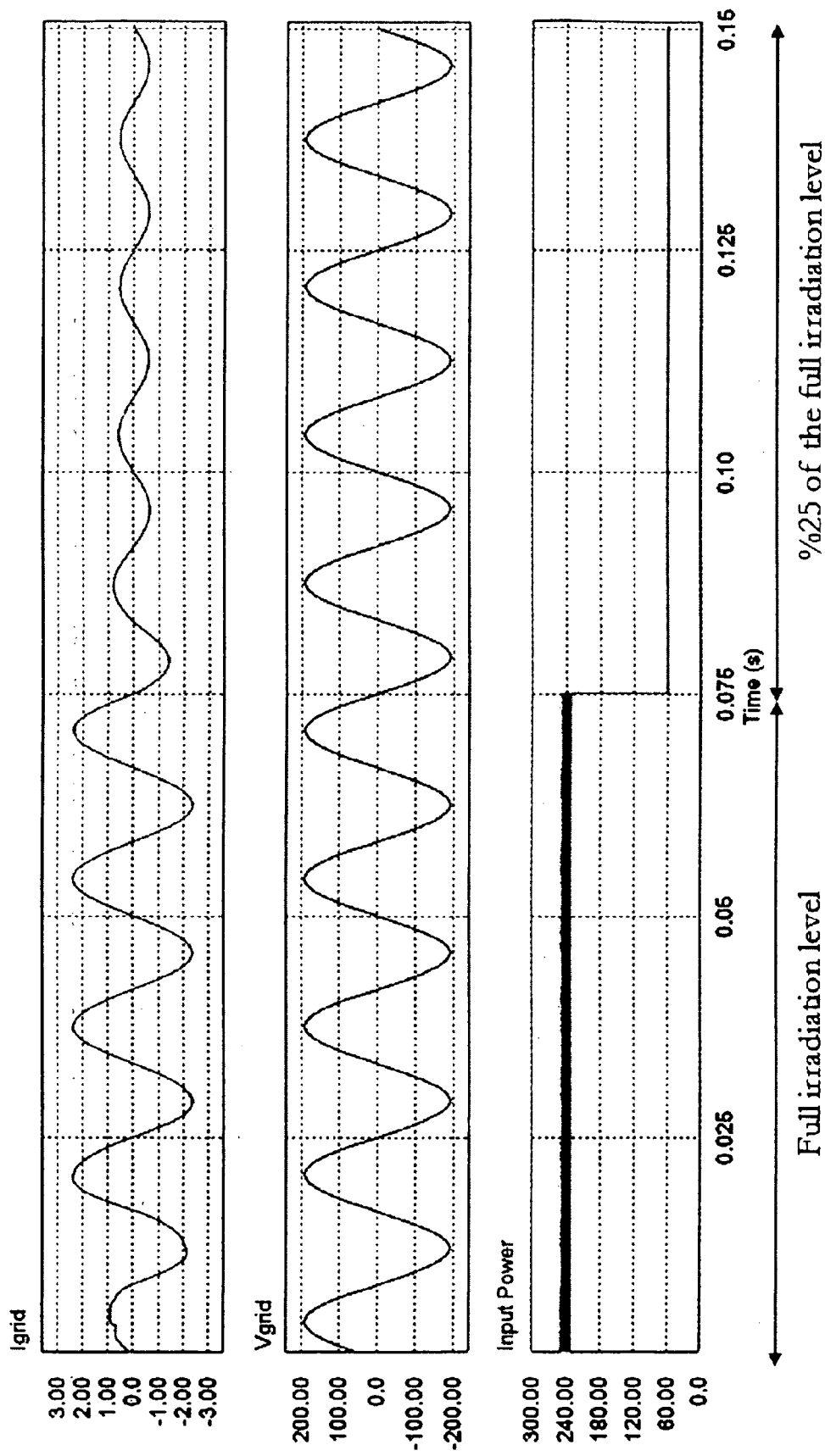
FIG. 10A shows performance of the micro-inverter system with no grid harmonics for input irradiation step change in a sample PV system.
Figure 10B:
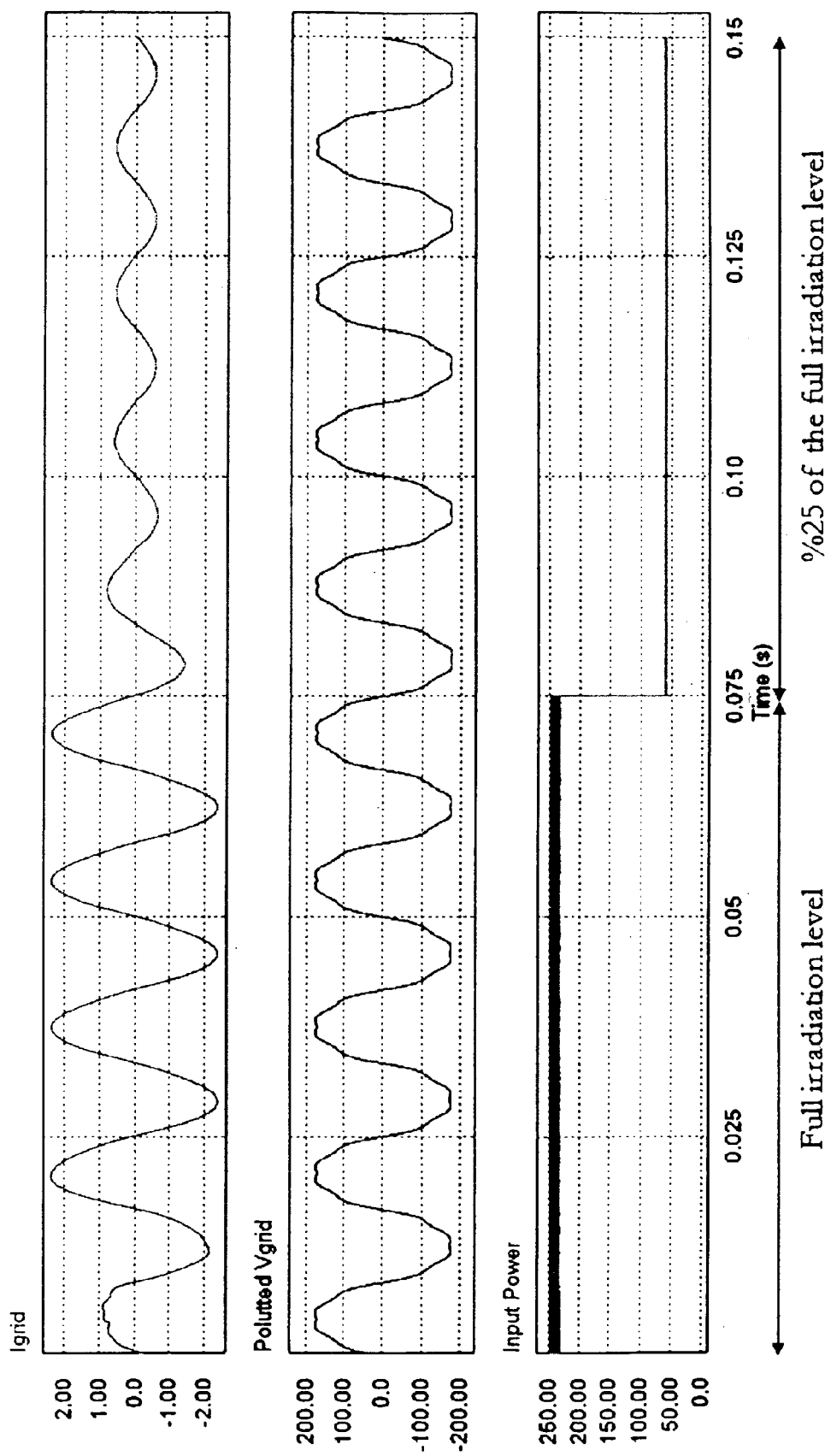
FIG. 10B shows performance of the micro-inverter system when the grid is distorted for input irradiation step changes in a sample PV system.
Figure 13:
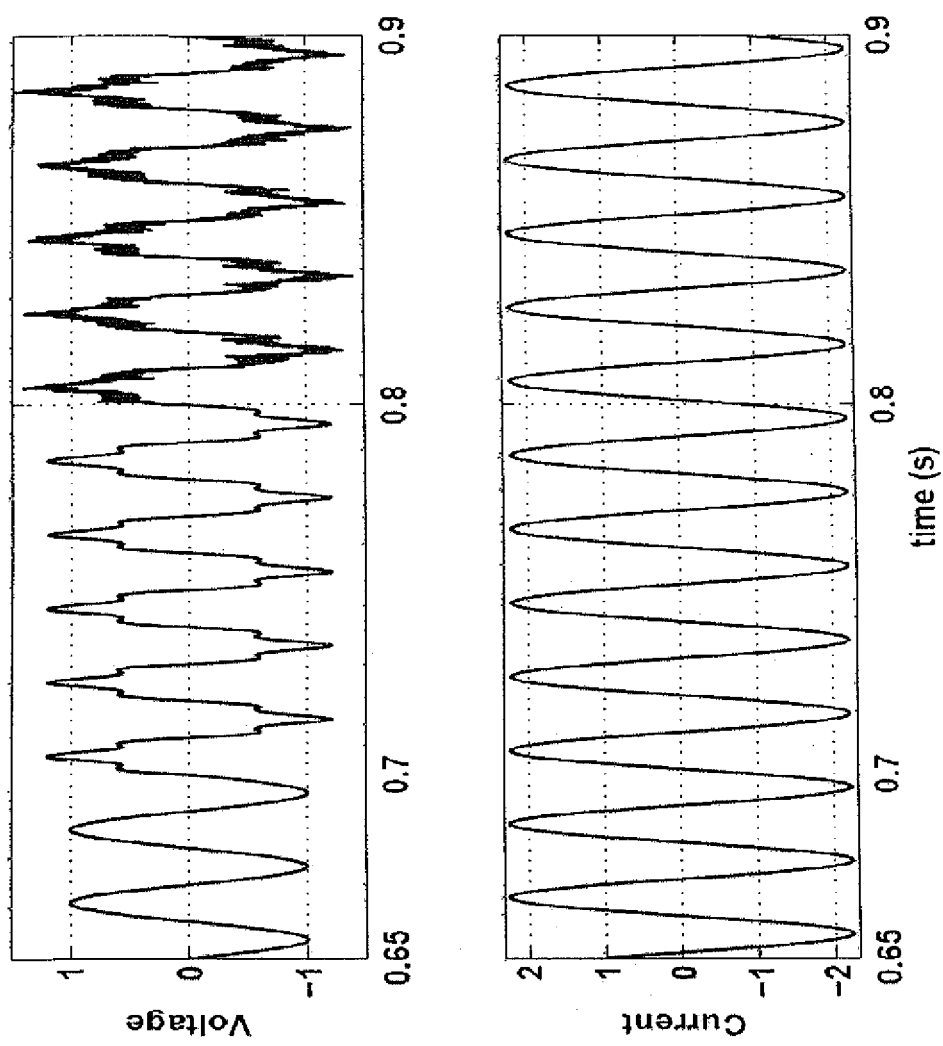
FIG. 13 shows performance of the micro-inverter system against grid voltage harmonics and noise: (a) grid voltage; (b) grid current.

FIGS. 10A and 10B show performance of the embodiment of FIG. 6A for two cases where the grid voltage is smooth and when it is distorted. The shown scenario corresponds to a case where the irradiation level is dropped from 100 percent to 25 percent at the time instant 0.075 s. Fast and smooth grid current injection that signifies injection of high-quality power is observed. Another simulation result is shown in FIG. 13 that confirms desirable performance of the system when the grid voltage is distorted by harmonics and/or noise. In this Figure, the grid voltage undergoes 20% of the fifth harmonic at t=0.7 s and then white noise with variance 0.01 is also added at t=0.8 s. The grid current is shown and is highly sinusoidal despite the extreme distortion and noise which is present at the voltage terminals.

Figure 6B:
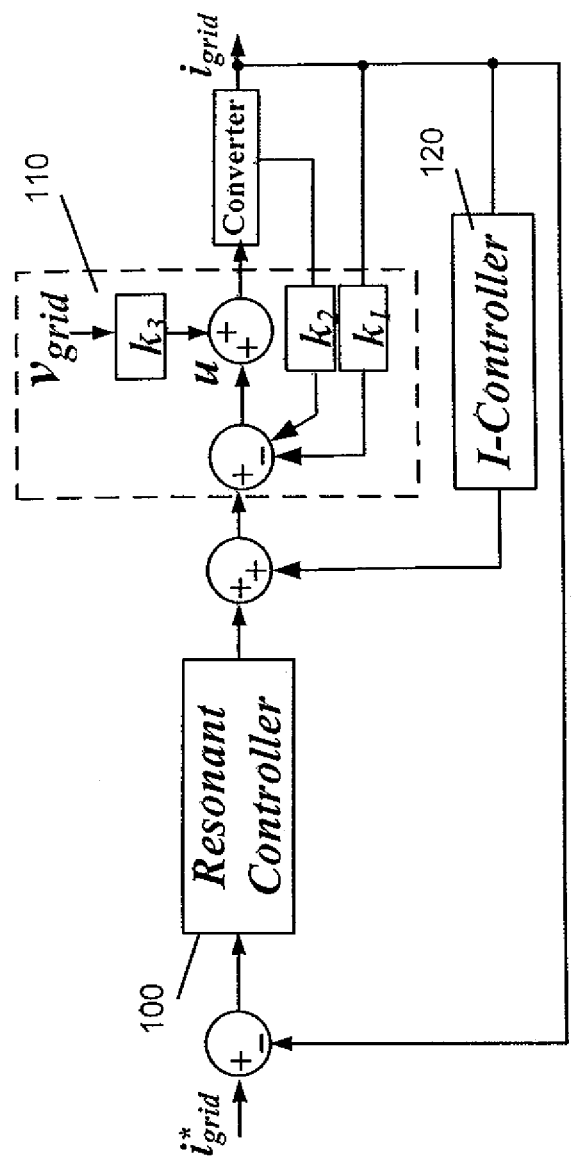
FIG. 6B shows a block diagram of a closed-loop feedback scheme used in an embodiment of the current controller portion of the controller section, designed using the improved LQR method for removing dc signal from grid current as described herein.

According to another embodiment of the current control section, multiple resonant controllers may be displaced as shown in FIG. 6B in order to reject harmonics of the grid voltage as well as those of the reference current. The gains of these controllers may also be optimally determined using the modified LQR method described herein.

Figure 6C:
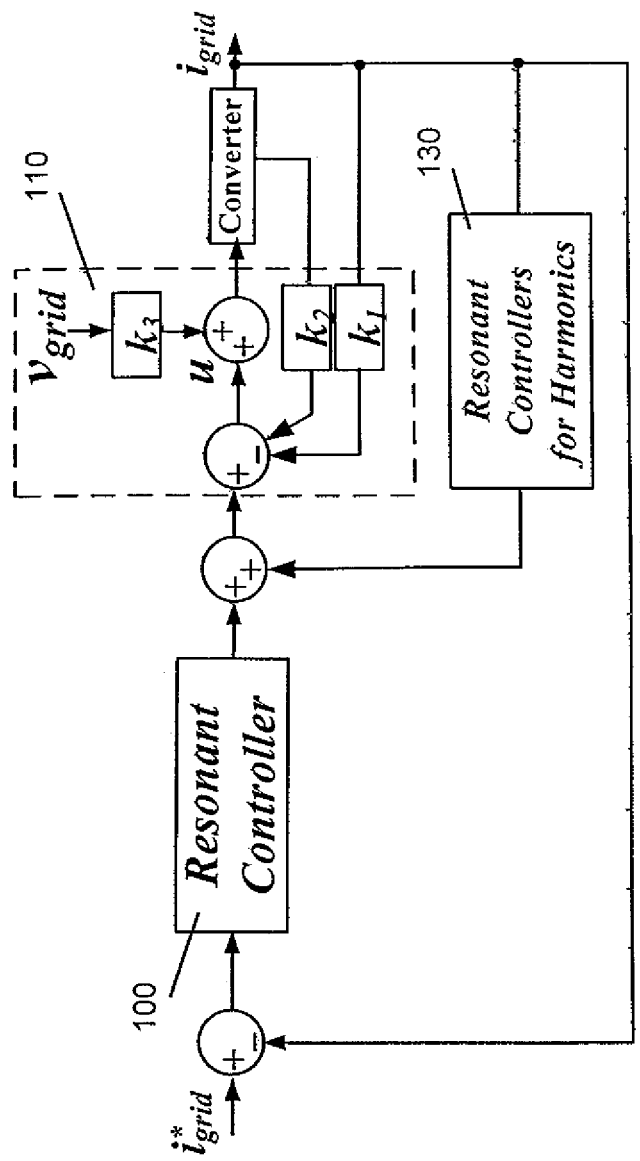
FIG. 6C shows a block diagram of a closed-loop feedback scheme used in an embodiment of the current controller portion of the controller section, designed using the improved LQR method for distorted grid voltage and distorted reference signal as described herein.

According to another embodiment of the current control section, an integrating controller is included as shown in FIG. 6C in order to reject any possible dc component that may exist in the grid current. The gain of this controller may also be optimally determined using the modified LQR method described herein.

Figure 6D:
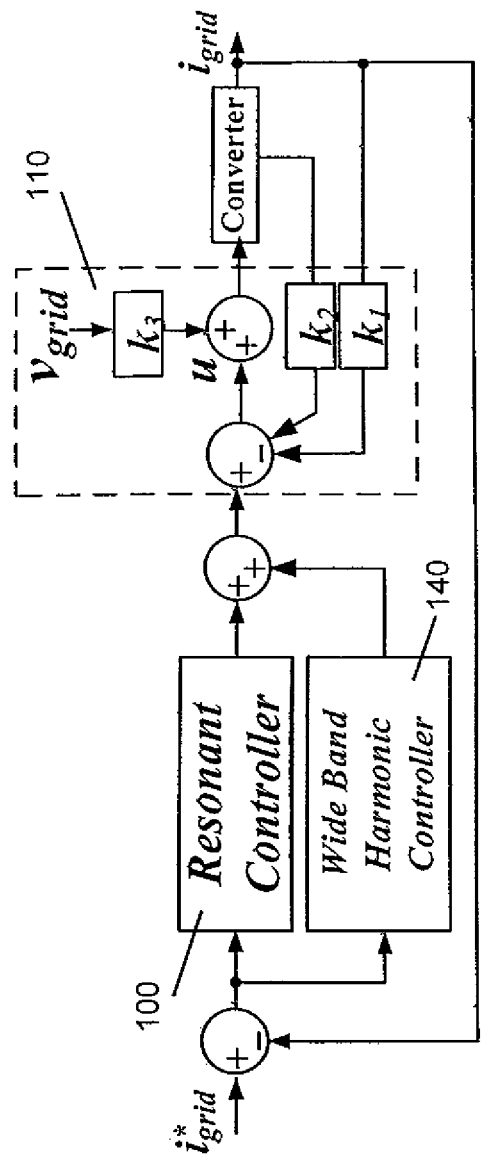
FIG. 6D shows a block diagram of a closed-loop feedback scheme used in an embodiment of the current controller portion of the controller section, for suppressing harmonics in wide frequency band as described herein.

According to another embodiment of the current control section, a wide band harmonic controller is included as shown in FIG. 6D in order to suppress harmonics that are within a wide range of frequencies. This controller may have a proportional, proportional derivative, lead, or lead-lag structure.

Figure 6E:
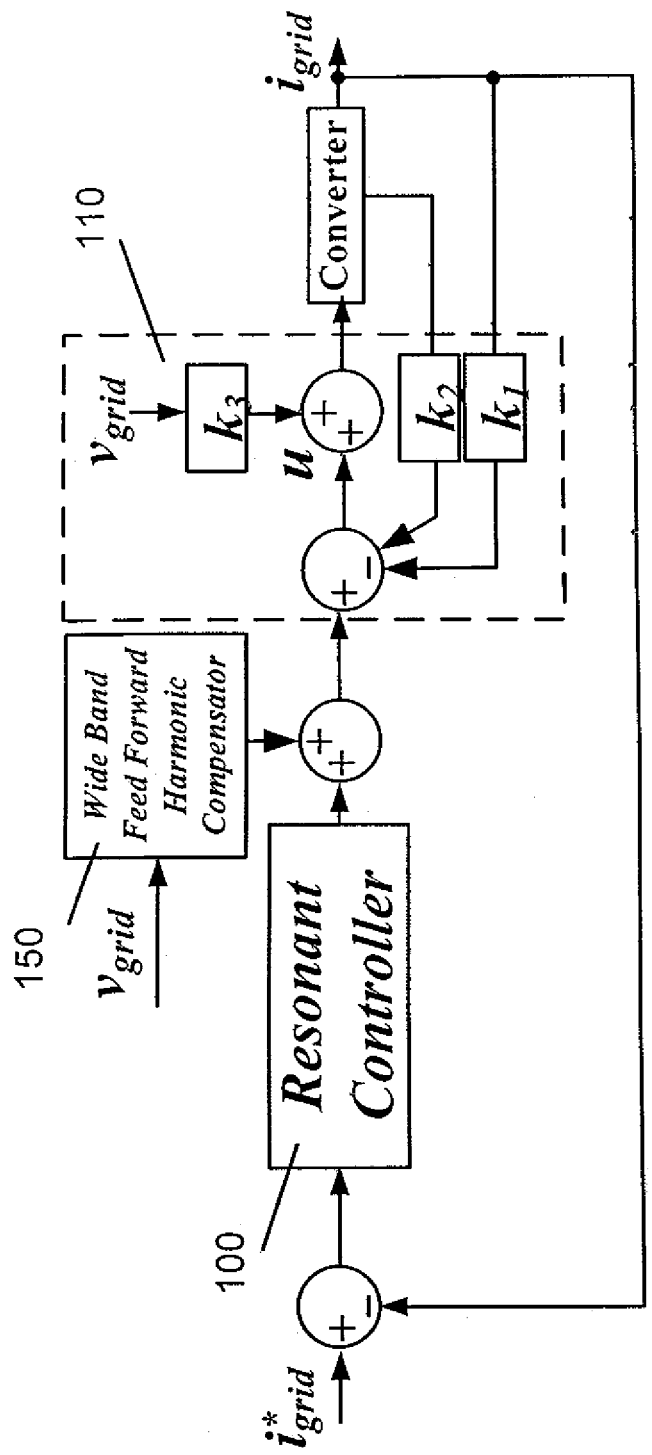
FIG. 6E shows a block diagram of a closed-loop feedback scheme used in an embodiment of the current controller portion of the controller section, for compensating for the harmonics in wide frequency band as described herein.

According to another embodiment of the current control section, a wide band feed forward harmonic compensator is included as shown in FIG. 6E in order to compensate for harmonics that are within a wide range of frequencies. This compensator may have a proportional, proportional derivative, lead, or lead-lag structure.

Figure 12:
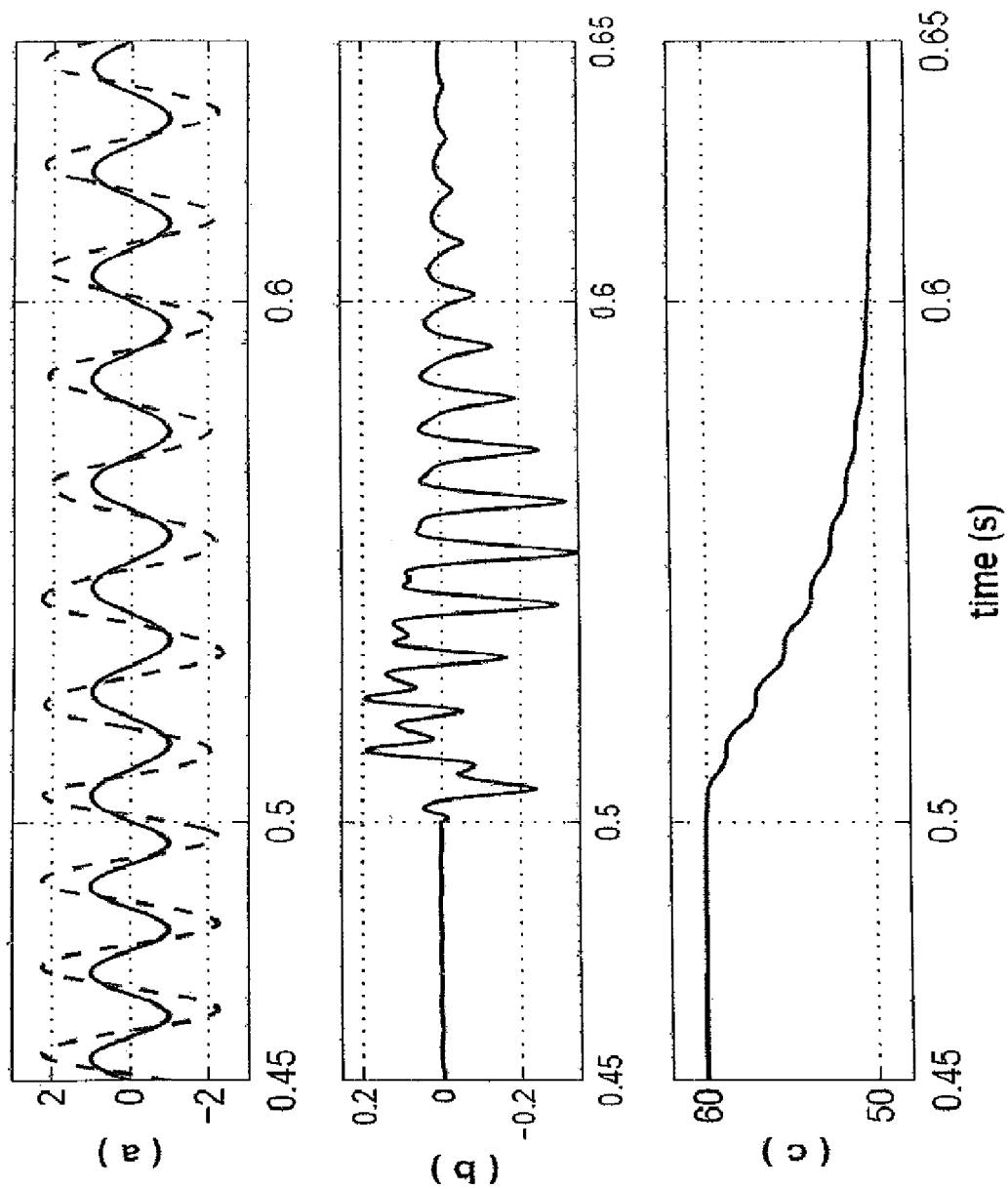
FIG. 12 shows performance of the micro-inverter system against grid frequency variations: (a) grid voltage (solid) and current (dashed); (b) instantaneous power error; (c) estimated frequency.

It is appreciated that a current control section of the embodiments described herein may use one or combine any two or more configurations, such as those shown in FIGS. 5, 6A, 6B, 6C, 6D, and 6E. The closed-loop controller embodiment is robust against both large variations of system uncertainties and large measurement noise which is caused by the switching actions of the inverter. The controller section handles distortion and possible frequency swings in the grid voltage without negative impact on its performance. The resonance phenomenon is sufficiently damped and virtually no oscillation appears on the signals. Frequency adaptability of the system is achieved, owing to the EPPL feature of the system. Moreover, the R controllers are appropriately structured to avoid any error caused by fast frequency changes. FIG. 12 shows a sample performance of the system when a large frequency variation from 60 to 50 Hz occurs. FIG. 12(a) shows the grid current (dashed) and voltage (solid) signals, FIG. 12(b) shows the instantaneous power error, and FIG. 12(c) shows the estimated frequency. The system has adjusted the operating frequency and the injected power remains unchanged in the steady-state.

The controller section embodiments may be implemented in, for example, DSP microprocessors and/or FPGAs. However, care must be taken to make the controller insensitive to both controller parameter length and quantization errors for fixed-point implementations. The use of delta operator as stated in existing literature may be beneficial in this regard. As a result the implementation of the controller section becomes less complicated and more compact in a FPGA.

The nonlinear control embodiment of FIG. 2 is mathematically derived and discussed below for the sake of completion. Assume the grid voltage at the point of coupling is denoted by v(t) and the injected current by the DG is i(t). The objective is to control the current to ensure appropriate injection of the instantaneous power p(t)=v(t)i(t) to the grid. The power is conveniently characterized by its active and reactive components denoted by P and Q respectively. In a sinusoidal situation where v(t)=V sin($\phi_v$) and i(t)=I sin($\phi_i$), the instantaneous power is $$p(t) = v(t)i(t) \quad (22)$$

$$= \frac{1}{2}VI\cos\varphi[1 - \cos(2\varphi_v)] +$$

-continued $$\frac{1}{2}VI\sin\varphi\sin(2\varphi_v)$$

$$= P[1 - \cos(2\varphi_v)] - Q\sin(2\varphi_v)$$

where $\phi=\phi_v-\phi_i$ and P=½VI cos $\phi$ and Q=−½2VI sin $\phi$.

Assume that the commands for active and reactive powers are denoted by $P_{ref}$ and $Q_{ref}$, respectively. Then the command for the instantaneous power is given by $$p_{ref}(t)=P_{ref}[1-\cos(2\phi_v)]-Q_{ref}\sin(2\phi_v). \quad (23)$$

Define the cost function $$J[i(t)]=[p_{ref}(t)-p(t)]^2=[p_{ref}(t)-v(t)i(t)]^2 \quad (24)$$

which is the instantaneous square error between the actual power and the reference power. The objective as stated above can now be translated into finding an appropriate current i(t) which minimizes J[i(t)]. To address a solution to this problem, the current is i(t)=I sin($\phi_i$) where ($\phi_i=\int_0^t\omega(\tau)d\tau-\phi$ in which $\omega$ is the grid frequency. The voltage signal v(t)=V sin($\phi_v$) is taken as the reference such that $\phi_v=\int_0^t\omega(\tau)d\tau$. The cost function will then be a function of smooth unknown variables $\theta=(I,\phi)$. The same strategy used to derive the EPLL equations (which is based on gradient descent method) may be adopted to arrive at equations governing variations of these unknown variables. The general expression is $\dot{\theta}=-\mu\partial J(\theta)/\partial\theta$, in which $\mu$ is a positive-definite 2×2 matrix. Assuming a diagonal structure as $\mu=\text{diag}\{\mu_1, \mu_2\}$, the resulting equations can be summarized as $$\dot{I}(t)=\mu_1 e(t)v(t)\sin(\phi_i)$$

$$\dot{\phi}_i(t)=\mu_2 e(t)v(t)\cos(\phi_i)+\omega \quad (25)$$

where e(t)=$p_{ref}(t)$−p(t)=$p_{ref}(t)$−v(t)i(t) and i(t)=I sin($\phi_i$).

Equation set (25) shows how the desired variables I and $\phi_i$ must be changed to ensure minimum error between the actual power and the desired power. FIG. 2 shows the scheme. Equation (23) shows how in FIG. 2 the instantaneous power reference $p_{ref}$(t) is synthesized from the active and reactive reference values $P_{ref}$ and $Q_{ref}$. Moreover, an EPLL is employed on the voltage signal to obtain the phase-angle and frequency. A feature of the EPLL, in this context, is its ability to eliminate the double frequency harmonics in single phase applications, which makes it useful for grid connected single-phase applications.

In the following, mathematical proof is given to show the dc voltage controller performance and its design method. Equation (26) shows the power balance equation for the dc-bus, where $p_{in}$ is the input power and $p_{out}$ is the inverter output power. This equation is nonlinear.

$$Cv_{dc}\frac{dv_{dc}}{dt} = p_{in} - p_{out} \quad (26)$$

By defining dc link energy ($w_c$) as a new state variable, the linear equation (27) is obtained, where $p_L$ is the instantaneous power stored in the output filter.

$$\dot{w}_c=-vi+p_{in}=-v_g i-p_L+p_{in} \quad (27)$$

The two terms $v_g i$ and $p_L$ are double frequency signals and $p_{in}$ is a dc signal. The result is that $w_c$ consists of only dc and double frequency terms. Thus $v_{dc}$ has many higher order harmonics. This means that a notch filter centered at the double frequency may not be able to filter out the harmonics from the control loop if, as traditionally done, $v_{dc}$ is used for the feedback loop. On the other hand, a feedback loop on $w_c$ eliminates this problem. This phenomenon is shown in FIG. 14 where the method does not cause any ripples on the output current.

Figure 15:
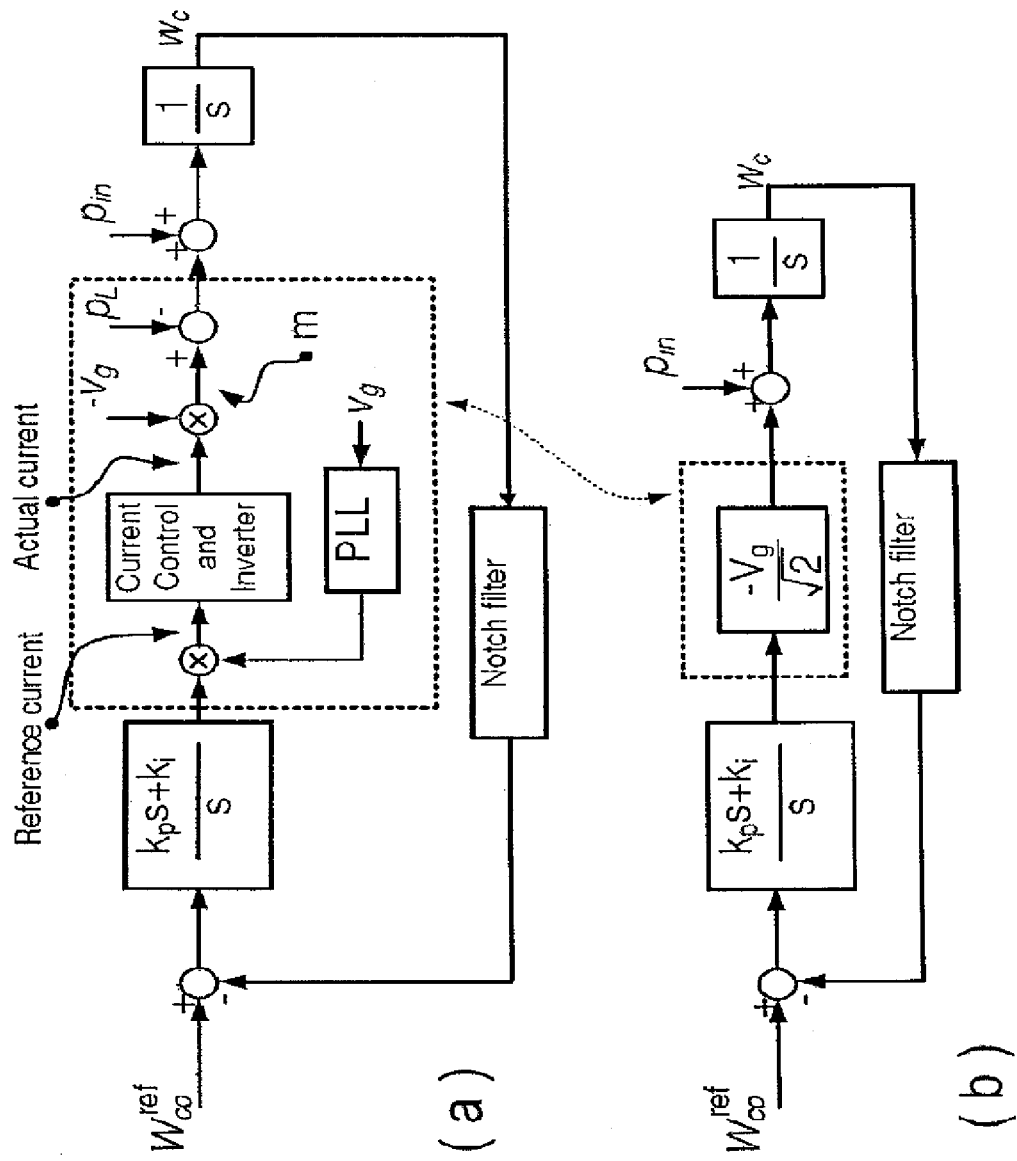
FIG. 15(a) shows an embodiment of the dc-bus control loop where the signals in the loop include dc and double frequency terms.
FIG. 15(b) shows an embodiment of a simplified linear loop.

This method not only avoids ripples but also facilitates the design procedure for the dc link control loop. The complete control loop is shown in FIG. 15(a) where the signals in the loop include dc and double frequency terms. Since the current controller is faster than the dc link control loop, this embodiment may be simplified as shown in FIG. 15(b), which shows a linear loop. Any well-known linear system design technique may be used to design the PI controller coefficients for the loop. The characteristic equation for the loop is given in (28).

$$s^2(s^2+4\xi w_o s+4w_o^2)-\alpha(k_p s+k_i)(s^2+4w_o^2)=0 \quad (28)$$

The contents of all references, pending patent applications, and published patents cited throughout this application are hereby expressly incorporated by reference.

Equivalents

Those skilled in the art will recognize or be able to ascertain variants of the embodiments described herein. Such variants are within the scope of the invention and are covered by the appended claims.

The invention claimed is:

1. A controller for a power circuit that interfaces distributed power generation with a power distribution grid, comprising:
   a first circuit that receives signals corresponding to the distributed power generation voltage and current, and outputs to the power circuit a signal for controlling the voltage or current of the distributed power generation;
   a dc voltage or dc current controller that receives a dc voltage or dc current of the power circuit and generates a power signal;
   a current reference generator that receives the power signal from the dc voltage or dc current controller and receives signals corresponding to the power distribution grid voltage and current, and outputs a current reference signal;
   an output current controller that minimizes a difference between the output grid current and the current reference signal from the current reference generator and outputs a first control signal;
   a harmonic rejection and/or dc rejection circuit that receives a signal corresponding to the power distribution grid voltage or current and outputs a second control signal; and
   a second circuit that receives the first and second control signals and outputs at least one gating signal that controls the power circuit;
   such that substantially harmonic-free and/or dc-free power is delivered to the power distribution grid.

2. The controller of claim 1, wherein the power circuit includes a current source inverter.

3. The controller of claim 1, wherein the power circuit includes a voltage source inverter.

4. The controller of claim 1, wherein the distributed power generation includes at least one photovoltaic (PV) module.

5. The controller of claim 1, wherein the current reference generator:
   (i) includes nonlinear elements;
   (ii) includes an instantaneous power calculator that generates an instantaneous power reference signal; and
   (iii) generates the current reference signal from the instantaneous power reference signal and the grid voltage and current.

6. The controller of claim 5, including an enhanced phase locked loop (EPLL).

7. The controller of claim 6, wherein the EPLL provides a phase angle of the grid voltage which is used to generate the instantaneous power reference signal.

8. The controller of claim 1, wherein the controller accepts real and reactive power commands to control real and reactive power delivered to the power distribution grid.

9. The controller of claim 8, wherein the real and reactive power commands are set externally.

10. The controller of claim 8, wherein the real power command is generated by a proportional integral (PI) controller operating on a dc-link voltage error, on a dc link current error, or on a dc-link energy error.

11. The controller of claim 1, wherein the current reference generator comprises an energy calculator, a notch filter, and at least one PI controller.

12. The controller of claim 11, including an EPLL.

13. The controller of claim 12, wherein the EPLL generates parallel and orthogonal signals corresponding to the grid voltage.

14. The controller of claim 13, wherein a first PI controller operates on an error between (i) a reference energy signal and (ii) an actual energy signal corresponding to the dc voltage of the power circuit, and multiplies a PI output with the parallel signal from the EPLL to generate a real current component of the current reference signal.

15. The controller of claim 13, wherein a second PI controller operates on an error between (i) a reference reactive power signal and (ii) an actual reactive power signal corresponding to the output power of the power circuit, and multiplies a PI output with the orthogonal signal from the EPLL to generate a reactive component of the current reference signal.

16. The controller of claim 1, wherein the current controller includes a semi-state feedback control structure combined with a resonant-type output feedback portion.

17. The controller of claim 1, wherein the current controller includes a semi-state feedback control structure combined with a resonant-type output feedback portion and a soft-start feed forward controller.

18. The controller of claim 17, wherein the current controller includes one or more resonant-type output feedback portions.

19. The controller of claim 18, wherein each resonant-type output feedback portion corresponds to a harmonic of the grid voltage.

20. The controller of claim 17, wherein the current controller includes:
   (i) one or more resonant-type harmonic controllers acting on grid current;
   (ii) an integrating controller acting on grid current;
   (iii) a wide band hail ionic controller in parallel with the resonant-type controller;
   (iv) a wide band harmonic controller in series with the resonant-type controller; or
   (v) a wide band feed forward harmonic compensator acting on the grid voltage signal; or
   (vi) at least a portion of one or more of (i) to (v).

21. The controller of claim 20, wherein the wide band harmonic controller has a proportional, proportional-derivative, lead, or lead-lag configuration.

22. The controller of claim 20, wherein the wide band feed forward harmonic compensator has a proportional, proportional-derivative, lead, or lead-lag configuration.

23. The controller of claim 1, including a maximum power point tracker.

* * * * *